US012692334B2

(12) United States Patent
Yang et al.

(10) Patent No.: US 12,692,334 B2
(45) Date of Patent: Jul. 28, 2026

(54) COPOLYMERIZED SUPERABSORBENT POLYMERS

(71) Applicant: Kimberly-Clark Worldwide, Inc., Neenah, WI (US)

(72) Inventors: Kaiyuan Yang, Cumming, GA (US); Xuedong Song, Alpharetta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 661 days.

(21) Appl. No.: 18/027,670

(22) PCT Filed: Sep. 28, 2020

(86) PCT No.: PCT/US2020/053003

§ 371 (c)(1),
(2) Date: Mar. 22, 2023

(87) PCT Pub. No.: WO2022/066180

PCT Pub. Date: Mar. 31, 2022

(65) Prior Publication Data

US 2023/0383036 A1 Nov. 30, 2023

(51) Int. Cl.
*C08F 222/02* (2006.01)

(52) U.S. Cl.
CPC .................................. *C08F 222/02* (2013.01)

(58) Field of Classification Search
CPC ... C08F 222/06; C08F 222/385; C08F 228/02
See application file for complete search history.

(56) References Cited

U.S. PATENT DOCUMENTS 4,090,013 A 5/1978 Ganslaw et al.
4,295,987 A 10/1981 Parks
4,786,557 A * 11/1988 Kakuishi ............ C08G 18/0819 428/425.9
4,801,505 A * 1/1989 Ejiri ....................... G11B 5/702 428/404
5,075,399 A 12/1991 Ahmed et al.
5,290,870 A * 3/1994 Ahmed ................. C08F 255/02 525/291
5,885,462 A 3/1999 Biver et al.
6,068,924 A 5/2000 Palumbo
(Continued)

FOREIGN PATENT DOCUMENTS

CN 1430639 A 7/2003
CN 103183764 A 7/2013
(Continued)

OTHER PUBLICATIONS

Office Action for Brazilian application No. BR 11 2023 005549.0 received Oct. 14, 2025; 4 pages.
(Continued)

*Primary Examiner* — Peter A Salamon
(74) *Attorney, Agent, or Firm* — Armstrong Teasdale LLP

(57) ABSTRACT

Described herein are novel super absorbent materials. The super absorbent materials are copolymerized with strong or super strong ionizable monomers and bulky counter ions or select metal salts. The copolymer-based super absorbent materials have significantly improved absorbance properties. The compositions and methods described herein are useful in a variety of absorbent products.

10 Claims, 12 Drawing Sheets

(56) References Cited

U.S. PATENT DOCUMENTS

| | | | | |
|---|---|---|---|---|
| 6,429,261 | B1 | 8/2002 | Ang et al. | |
| 6,683,143 | B1 | 1/2004 | Mumick et al. | |
| 6,814,974 | B2 | 11/2004 | Cole et al. | |
| 7,101,456 | B2 | 9/2006 | Bunyard et al. | |
| 7,977,530 | B2 | 7/2011 | Dodge, II et al. | |
| 8,318,306 | B2 | 11/2012 | Tian et al. | |
| 9,109,059 | B2 | 8/2015 | Way et al. | |
| 2002/0169252 | A1* | 11/2002 | Wilson | C08F 265/04 526/89 |
| 2003/0138631 | A1 | 7/2003 | Mitchell et al. | |
| 2003/0144379 | A1 | 7/2003 | Mitchell et al. | |
| 2004/0024104 | A1 | 2/2004 | Ota et al. | |
| 2004/0034138 | A1 | 2/2004 | Buscall et al. | |
| 2005/0031850 | A1 | 2/2005 | Mitchell et al. | |
| 2006/0008592 | A1 | 1/2006 | Badyal et al. | |
| 2016/0375171 | A1 | 12/2016 | Omori et al. | |
| 2018/0105665 | A1 | 4/2018 | Matsubara et al. | |
| 2019/0017225 | A1 | 1/2019 | Palumbo | |
| 2019/0315930 | A1* | 10/2019 | Kim | C08F 220/06 |
| 2019/0366658 | A1* | 12/2019 | Lang | G02B 1/043 |
| 2019/0366660 | A1* | 12/2019 | Ge | G02B 1/043 |

FOREIGN PATENT DOCUMENTS

| | | | |
|---|---|---|---|
| CN | 103374099 | A | 10/2013 |
| CN | 104024291 | A | 9/2014 |
| CN | 115667335 | A | 1/2023 |
| EP | 0068189 | A1 | 1/1983 |
| EP | 0479245 | A2 | 4/1992 |
| EP | 0540237 | A2 | 5/1993 |
| EP | 0839841 | A2 | 5/1998 |
| JP | H0314809 | A | 1/1991 |
| JP | H05170835 | A | 7/1993 |
| JP | H06122708 | A | 5/1994 |
| JP | H10168129 | A | 6/1998 |
| WO | 9617681 | A1 | 6/1996 |
| WO | 0141818 | A1 | 6/2001 |
| WO | 2005027987 | A1 | 3/2005 |

OTHER PUBLICATIONS

Ma, Songmei et al., "Preparation and properties of a salt-resistant superabsorbent polymer," Journal of Applied Polymer Science; Sep. 2004; pp. 2532-2541.

Fan, Yisa et al., "Synthesis of a Novel and Salt Sensitive Superabsorbent Hydrogel Using Soybean Dreggs by UV-Irradiation," Materials 2018, vol. 11, 2198; 12 pp.

Verma, Mahendra Kumar et al., "To Study the effect of different salt solution on swelling behavior of Nano clay polymer composite superabsorbent," International Journal of Chemical Studies 2018; 6(10); pp. 768-775.

Sadeghi, Mohammad et al., Synthesis and super-swelling behavior of a novel low salt-sensitive protein-based superabsorbent hydrogel: collagen-g-poly (AMPS), Turk J. Chem 2010; vol. 34, pp. 739-752.

Zhao, Chenhao et al., "Salt-Tolerant Superabsorbent Polymer with High Capacity of Water-Nutrient Retention Derived from Sulfamic Acid-Modified Starch," ACS Omega 2019; vol. 4, pp. 5923-5930.

Zhu, Wenjuan et al., "Preparation and Applications of Salt-Resistant Superabsorbent Poly (Acrylic Acid-Acrylamide/Fly Ash) Composite," Materials 2019; vol. 12, 596, 16 pp.

Heydarifard, Solmaz et al., "Impact of Counter lons of Cationic Monomers on the Production and Characteristics of Chitosan-Based Hydrogel," ACS Omega 2019; vol. 4, pp. 15087-15096.

PCT International Search Report and Written Opinion for Patent Application PCT/US2020/053003 mailed Jul. 5, 2021; 16 pp.

PCT Third Party Observation for Patent Application PCT/US/2020/053003 submitted Jan. 27, 2023; 11 pp.

Office Action for Korean application No. KR 10-2023-7013614 received Jul. 10, 2025; 10 pages.

Office Action for Brazil application No. BR112023005549-0 received Nov. 13, 2023; 5 pp.

Office action and Search Report for Chinese application No. CN202080105578.7 received Mar. 30, 2026, 18-pages.

* cited by examiner $FeCl_3$ $Fe_2Cl_6$

*fac*-$FeCl_3(H_2O)_3$

*mer*-$FeCl_3(H_2O)_3$

COPOLYMERIZED SUPERABSORBENT POLYMERS

CROSS-REFERENCE TO RELATED APPLICATION

This application is a U.S. National Phase Application of PCT/US2020/053003, filed Sep. 28, 2020, the content of which is hereby incorporated by reference in its entirety.

FIELD OF DISCLOSURE

This disclosure is directed to novel super absorbent materials (SAMs). The SAMs are copolymerized with strong or super strong ionizable monomers and bulky counter ions or select metal salts. The copolymer-based SAMs have significantly improved absorbance properties. Compositions and methods in accordance with the present disclosure are useful in a variety of absorbent products.

BACKGROUND

Superabsorbent polymers (SAPs) are three-dimensional networks that can absorb and retain water (or other aqueous media) and physiological fluids such as urine and blood more than hundreds times of their own dry weight, typically depending on the ionic concentration of the aqueous solution. SAPs have applications in a variety of fields, including medicine, personal care products, biomaterials, biosorbents, and agriculture. The first commercial SAPs were produced in 1970 through the alkaline hydrolysis of starch-g-polyacrylonitrile. While these polymers could absorb up to 500 g/g of water, they were mechanically weak in their swollen state. SAPs were industrially developed in Japan and USA in the early 1980s for hygienic applications. It was found that SAPs had the potential to replace fluff, making their use in hygienic products such as baby diapers and feminine napkins cost effective.

Desired features of SAPs include high absorption capacity, high and tunable swelling rate, high absorbency under load, good strength of the swollen gel, high gel fraction after crosslinking, excellent durability and stability upon swelling and during storage, non-toxicity, and low cost. Although current hydrogel systems offer good performance in several of these different aspects, several drawbacks exist with various formulations, including low absorbency under pressure, gel blockage (by which the initial layer of SAP forms a relatively impermeable barrier to subsequent water diffusion and uptake deeper into the material), and high sensitivity to the electrolyte solutions. Various strategies have been employed to address these challenges, including forming composite and nanocomposite hydrogels, interpenetrating polymer network (IPN) hydrogels, and various surface treatments; however, improvements are still required to enable the use of minimal material in a broadest possible range of applications.

The nature of monomers and crosslinkers, their concentrations, and molar ratios are known as the most significant factors influencing the absorption capacity of a SAP. Acrylic acid, acrylamide and methacrylic acid are the most extensively-used monomers to prepare SAPs commercially. However, the potential presence of some residual acrylamide in the gels poses a challenge in the practical use of such hydrogels for human health and personal care products. Conversely, the water absorbing and swelling properties of ionic SAPs (e.g. based on acrylic acid or methacrylic acid) are substantially decreased in salt-containing liquids, including physiological fluids like urine and blood. The reason for this salt sensitivity is that the counterions such as sodium ions (Na) present in physiological fluids can effectively screen the polymer backbone charges, resulting in counterion condensation with polymer-bound charged groups and, consequently, reduced counterion entropy and direct chain-chain repulsion forces available to drive a swelling response.

Conventional SAMs are mainly made of two classes of SAPs: synthetic polymers and natural polymers. In general, synthetic superabsorbent polymers are charged polyelectrolytes such as salts of polyacrylic acid (PAA), polyvinyl sulfonic acid, polyvinyl phosphoric acid, and partially hydrolyzed maleic anhydride copolymers. Natural polymers include both neutral and charged polymers such as carboxymethylcellulose, sodium alginate, chitosan salt and modified starch. All these known SAMs have substantial limitations. For instance, the most widely used commercial PAA-based SAMs have limited absorbency under load (AUL) and are also very salt-sensitive.

The salt sensitivity of SAMs leads to lowered gel swelling capacity. To compensate for the lowered capacity induced by salt sensitivity, more SAM materials are required in personal care garments so that enough absorbing capacity can be guaranteed for preventing leakage. Accordingly, there is a strong need in the personal care industry to improve or overcome the salt sensitivity of conventional SAM materials.

However, SAM salt sensitivity is a challenging problem to address. Although multiple attempts have been made in the art, all of the proposed solutions remain impractical and cost prohibitive. It is well understood in the art that the major portion of the SAM is in its neutralized salt form and traditional thinking is that all these neutralized salt units are considered to be in their fully-ionized form, e.g. metal ions (e.g. $Na^+$) are all free to move around during swelling. It is also known in the art that salts are detrimental to capacity, and the high valent inorganic salts suppress SAM capacity more than monovalent salts such as sodium chloride. Accordingly, past salt sensitivity mitigation work for SAM materials has been mainly focused upon simply using more SAM materials to compensate the capacity loss, removing/reducing salts from physiological fluids such as urine, or trying to design new less salt sensitive structures.

In the present disclosure, it has been discovered that the traditional thinking that all neutralized salt units in SAM are fully-ionized is not correct. Rather, the true ionization ratio of neutralized salts units in SAM are quite low, as low as 7-15% or below in either water or in electrolyte solutions with comparable salt concentrations to physiological liquids such as urine (e.g. about 0.9% sodium chloride aqueous solutions). Thus, it was surprisingly found that SAM salt sensitivity mitigation can be achieved by managing SAM ionization levels. For example, increasing the ionization from 7% to 9% provides a potential of 29% increase in absorbency. In one specific example, it was surprisingly found that copolymerization of SAM monomers with a strong ionizable anionic unit and a super ionizable cationic counter ion could affect the salt sensitivity of SAMs.

In another specific example, it was also surprisingly found that copolymerization of SAM monomers with select metal salts having metal ions with an oxidation state of at least 2 could provide significant increases in CRC performance without detrimental impact to other performance attributes such as AUL Described herein are novels SAMs. The SAMs are copolymerized with strong or super strong ionizable monomers and bulky counter ions or select metal salts. The copolymer-based SAMs have significantly improved absorbance properties.

Compositions and methods in accordance with the present disclosure are useful in a variety of absorbent products.

OBJECTIVE OF THE DISCLOSURE

The aim of the present disclosure is to address the salt sensitivity of AA-based SAMs by using free radical polymerization techniques to copolymerize strong or super strong ionizable monomers and bulky counter ions or select metal salts into the AA-based SAM backbone. Such comonomers serve to modify the absorbency properties of the SAMs.

BRIEF DESCRIPTION OF THE DISCLOSURE

In one aspect, provided herein is a superabsorbent polymer comprising a polymer backbone comprising (i) a strong or super strong ionizable backbone monomer comprising an anion of a strong organic acid and a super ionizable counter ion, (ii) a neutralized backbone monomer, and (iii) optionally an un-neutralized backbone monomer, and optionally a crosslinker.

In another aspect, provided herein is a method of making a superabsorbent polymer comprising a polymer backbone comprising (i) a strong or super strong ionizable backbone monomer comprising an anion of a strong organic acid and a super ionizable counter ion, (ii) a neutralized backbone monomer, and (iii) optionally an un-neutralized backbone monomer, and optionally a crosslinker. The method comprises (i) forming a mixture comprising a solvent, a monomer, a compound comprising a strong organic acid anion and a super ionizable counter ion, and optionally a crosslinker, (ii) initiating a reaction; and (iii) reacting the mixture.

In yet another aspect, provided herein is a method of using a superabsorbent polymer comprising a polymer backbone comprising (i) a strong or super strong ionizable backbone monomer comprising an anion of a strong organic acid and a super ionizable counter ion, (ii) a neutralized backbone monomer, and (iii) optionally an un-neutralized backbone monomer, and optionally a crosslinker. The method comprises using the superabsorbent polymer in a consumer product.

In still another aspect, provided herein is a superabsorbent polymer comprising a polymer backbone comprising (i) a neutralized backbone monomer, (ii) a neutralized backbone monomer complexed with a coordination complex comprising a metal ion with an oxidation state of at least 2, (iii) optionally an un-neutralized backbone monomer, and (iv) optionally an un-neutralized backbone monomer, and optionally a crosslinker.

In another aspect, provided herein is a method of making a superabsorbent polymer comprising a polymer backbone comprising (i) a neutralized backbone monomer, (ii) a neutralized backbone monomer complexed with a coordination complex comprising a metal ion with an oxidation state of at least 2, (iii) optionally an un-neutralized backbone monomer, (iv) optionally an un-neutralized backbone monomer complexed with a coordination complex comprising a metal ion with an oxidation state of at least 2, and (v) optionally a crosslinker. The method comprises (i) forming a mixture comprising a solvent, a monomer, a salt comprising a metal ion with an oxidation state of at least 2, and optionally a crosslinker; (ii) initiating a reaction; and (iii) reacting the mixture.

In yet another aspect, provided herein is a method of using a superabsorbent polymer comprising a polymer backbone comprising (i) a neutralized backbone monomer, (ii) a neutralized backbone monomer complexed with a coordination complex comprising a metal ion with an oxidation state of at least 2, (iii) optionally an un-neutralized backbone monomer, and (iv) optionally an un-neutralized backbone monomer, and optionally a crosslinker. The method comprises using the superabsorbent polymer in a consumer product.

DETAILED DESCRIPTION OF THE DISCLOSURE

Figure 1:
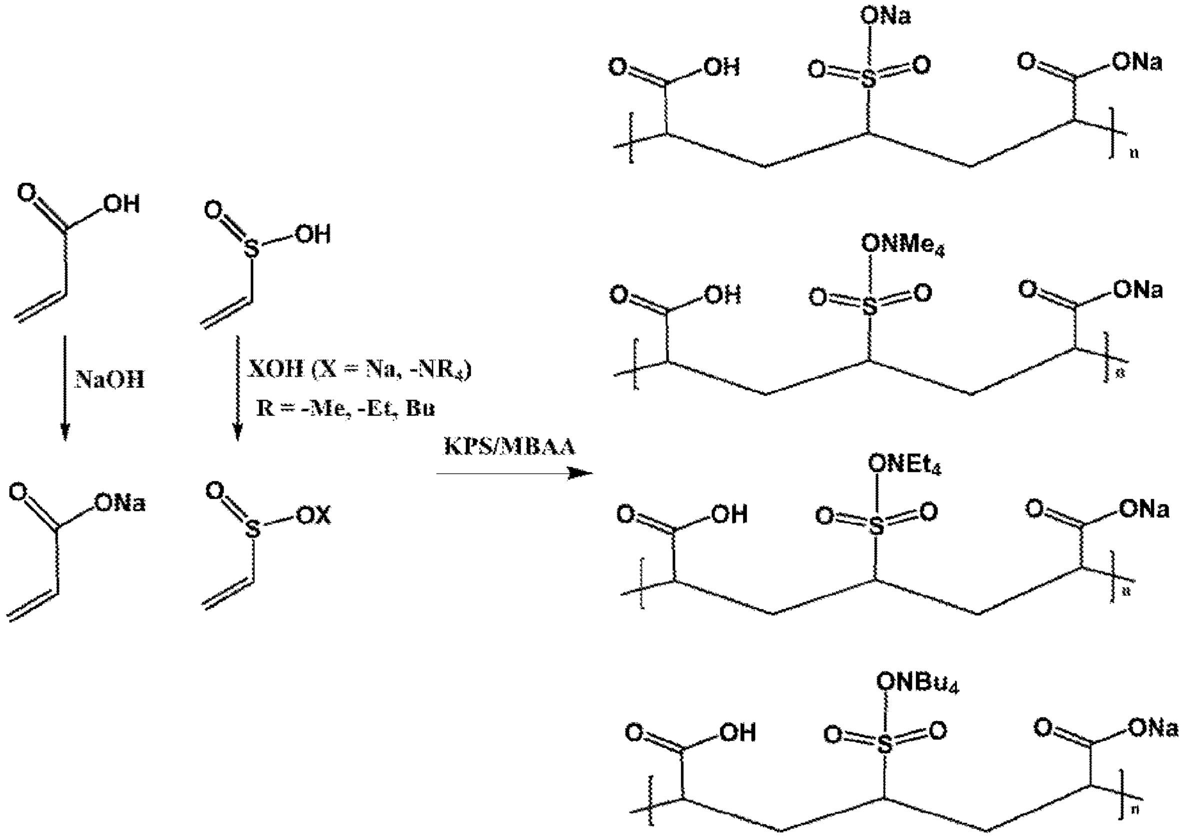
FIG. 1 is an exemplary embodiment in accordance with the present disclosure depicting copolymerization of acrylic acid, acrylic acid sodium salt, and vinylsulfonic acid sodium salt or tetraalkylammonium salts.

Superabsorbent polymers according to the present disclosure are copolymerized with certain monomers to improve CRC performance without negatively impacting AUL performance. This is achieved with two main categories of SAMs: SAMs copolymerized with strong or super strong ionizable monomers and bulky counter ions and SAMs copolymerized with select metal salts. The first category includes a strong or super strong ionizable backbone monomer comprising an anion of a strong organic acid and a super ionizable counter ion. The second category includes a backbone monomer complexed with a coordination complex comprising a metal ion with an oxidation state of at least 2. These categories are described separately in some parts of this disclosure, although it is understood that elements of the categories may be combined.

SAMs Copolymerized with Strong or Super Strong Ionizable Monomers and Bulky Counter Ions.

Superabsorbent polymers according to the present disclosure comprise a polymer backbone comprising (i) a strong or super strong ionizable backbone monomer comprising an anion of a strong organic acid and a super ionizable counter ion, (ii) a neutralized backbone monomer, and (iii) optionally an un-neutralized backbone monomer, and optionally a crosslinker.

The superabsorbent polymer is copolymerized from a strong or super strong ionizable monomer, a neutralized monomer, an un-neutralized monomer, and optionally a crosslinker. This copolymerized superabsorbent polymer enhances ionization, which is the main swelling driver of determining the osmotic pressure and charge-charge repulsion of SAMs.

The polymer backbone is random and lacks structured ordering of the strong or super strong ionizable backbone monomer, the neutralized backbone monomer, and the un-neutralized backbone monomer. The monomers of the polymer backbone may be arranged in a variety of manners. Individual monomers may be covalently bonded to identical or different monomers. True randomness may be described as the probability of finding a given type of monomer residue at a particular point along the polymer backbone being equal to the mole fraction of that monomer residue in the polymer backbone.

The superabsorbent polymer does not comprise a block copolymer of the strong or super strong ionizable backbone monomer, the neutralized backbone monomer, and the un-neutralized backbone monomer. The superabsorbent polymer also does not comprise an alternating copolymer of the strong or super strong ionizable backbone monomer, the neutralized backbone monomer, and the un-neutralized backbone monomer. Finally, the superabsorbent polymer does not comprise a graft copolymer of the strong or super strong ionizable backbone monomer, the neutralized backbone monomer, and the un-neutralized backbone monomer.

The strong or super strong ionizable backbone monomer comprises an anion of a strong organic acid and a super ionizable counter ion. Super ionizable counter ions according to the present disclosure can also be described as ghostly-bound or weakly-bound counter ions. In other words, these strong or super ionizable backbone monomers include a positive bulky mono counter ion that is larger than a proton ion or a sodium ion and an anion that is deprotonated from a strong organic acid. The use of bulky counter ions to replace small counter ions such as protons and sodium ions significantly weakens the electrostatic attractions between positive and negative ion pairs, which can make the full dissociation of counter ions from polymer chain negative ions much easier.

The term "strong" in the context of the ionizable backbone monomer primarily defines the anion that is deprotonated from a strong acid. When this anion is combined with a bulky, large ion, it becomes "a super strong" monomer. Thus, as used herein, a "strong" ionizable monomer is a monomer with a strong acid anion and sodium and potassium ions and a "super strong" ionizable monomer is a monomer with both a strong acid anion and a bulky, large ion that is larger than sodium ions Quantitatively, $pK_a$ value serves as a convenient term to express the relative acidity of a given acid to give up a proton. It is defined by the following equation:

$$pK_a = -\log K_a, \qquad \text{(Equation 1)}$$

where $K_a$ is the the dissociation constant of a given acid HA in aqueous solution. $K_a$ is defined by the following equation:

$$K_a = [A^-][H_3O^+]/[HA]. \qquad \text{(Equation 2)}$$

The AA monomer, and similar monomers used in the present application, has $pK_a$ values of around 4-5, which are in the weak acid category, while the strong acids suitable for the present application should have $pK_a$ values of at least below 3. For example, the $pK_a$ values of phosphoric acids, nitric acids, sulfonic acids, and sulfuric acid are in the range of about 2 to about −10. Some acids are even stronger than sulfuric acids and they can also be considered as suitable acids for the present invention. For example, the so-called super strong acid trifluorosulfonic acids are known to have $pK_a$ values in the range of about −14. It should be noted here that the use of bulky big ions actually can be understood to deliver ionization levels that are similar to super strong acids.

Described theoretically, but without being bound to any particular theory, the use of monomers with strong-ionizable and super-ionizable salt functionality increases the physical separation distance between a polymer chain negative charge center and its positive counter ion charge center so that the thermal energy of the positive counter ion, e.g. kT (where k is the Bolzmann's constant and T is the absolute temperature), can overcome the electrostatic interaction energy between the two charge centers, as shown below:

$$U = q_n q_p / \varepsilon r^2. \qquad \text{(Equation 3)}$$

In Equation 3, $q_n$ and $q_p$ are elementary charges, a is the dielectric constant, and r is the distance between two charges. In aqueous media, the equilibrium distance between the thermal energy and the electrostatic interaction energy of two point charges is defined by the Bjerrum Length. $\lambda_b$, at about 0.7 nanometers. In an electrolyte solution, this same distance is defined by the Debye Length, $\lambda_d$, and it depends upon the concentration of the electrolyte. For example, $\lambda_d$ is about 10 nm in 0.01 M electrolyte solutions and about 1 nm in 0.1 M electrolyte solutions. The Bjerrum length of 0.7 nm and Debye length of 1.0 nm in 0.1 M electrolyte solutions are each much larger than sodium counter ions, which have a diameter of about 0.2 nm.

Generally, any counter ion that is larger than 0.2 nm may be suitable in the present disclosure for increasing the physical separation from anions on the polymer chain. The strong or super strong ionizable backbone monomer may include more than one type of super ionizable counter ion. The polymer backbone may include more than one type of strong or super strong ionizable backbone monomer, where each strong or super strong ionizable backbone monomer may include more than one type of super ionizable counter ion.

Generally, the sizes of the suitable big or bulky counter ions should be at least 50% larger than the sodium ion, in some cases, at least 100%, and in some specific cases, at least 200-500%. In some embodiments, the super ionizable counter ion has a major dimension greater than about 0.25 nm, 0.3 nm, 0.4 un, 0.5 nm, 0.6 nm, 0.7 nm, 0.8 nm, 0.9 urn, 1.0 nm, 1.1 nm, 1.2 nm, 1.3 nm, 1.4 mu, or 1.5 nm. As used herein, a major dimension is the greatest length of a geometric object. Such lengths may include a diameter, a depth, a width, a height, a hypotenuse, a thickness, or other known geometric lengths.

In some specific embodiments, the super ionizable counter ion has a major dimension greater than about 0.25 nm, 0.5 nm, 0.7 nm, or 1.5 nm.

Examples of suitable super ionizable counter ions include ammonium, tetramethylammonium, tetraethylammonium, tetrabutylammonium, and combinations thereof. In many embodiments, the super ionizable counter ion comprises a linear or branched alkyl chain. The alkyl chain may have 1-6 carbons atoms. In general, dissolution decreases with increasing size of the super ionizable counter ion and may be limited with alkyl chains having more than 6 carbon atoms.

The general structure of a suitable anion of a strong organic acid is shown in Formula I:

(Formula I)

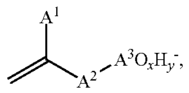

wherein

- $A^1$ is selected from the group consisting of hydrogen, halogens, fluorine, chlorine, bromine, iodine, alkyl groups, methyl groups, and ethyl groups;
- $A^2$ is selected from the group consisting of a direct bond, unsubstituted linear or branched $C_1$-$C_6$ alkyl chains, and linear or branched $C_1$-$C_6$ alkyl chains substituted with at least one substituent selected from the group consisting of alkyl groups, methyl groups, and ethyl groups;
- $A^3$ is an atom selected from the group consisting of sulfur, phosphorous, and nitrogen;
- x is a number selected from the group consisting of 1, 2, 3, and 4; and
- y is a number selected from the group consisting of 0, 1, and 2.

Examples of suitable anions of strong organic acids include sulfonic acid anions, phosphonic acid anions, and sulfuric acid, nitric acid, and phosphoric acid anions that are covalently bonded to a substituted or unsubstituted alkene group, such as those depicted in Formula I. The alkene group in Formula I contains a carbon-carbon double bond group that can undergo thermal, radical, or redox copolymerization with other desired monomers to form the new SAMs as described in this disclosure.

Although Formula I describes suitable strong and super strong ionizable monomers in accordance with the present disclosure, in some embodiments, some monomers that do not fit into Formula I might also suitable for the present invention. In general, such monomers include an alkene double bond for polymerization, a strong acid anion, and a bulky counterion. Examples of such monomers include but are not limited to 2-acrylamido-2-methylpropane sulfonic acid, 3-sulfopropyl methacrylate potassium salt, 3-sulfopropyl acrylate potassium salt, acrylate or methacrylate monomers with tethered sulfate groups and salts thereof, salts of vinyl-linker-acid units, salts of vinyl-linker-acid units and combinations thereof.

In some embodiments, the anion of a strong organic acid is selected from the group consisting of sulfonic acids, sulfuric acids, phosphonic acids, nitric acids, and combinations thereof. In some particular embodiments, the anion of a strong organic acid is selected from the group consisting of vinylsulfonic acid, vinylphosphoric acid, and combinations thereof.

Generally, the strong or super strong ionizable backbone monomer is present in an amount in the range of from about 0.01 to about 5 mol % of the superabsorbent polymer, the neutralized backbone monomer is present in an amount in the range of from about 50 to about 99 mol % of the superabsorbent polymer, and the un-neutralized backbone monomer is present in an amount in the range of from about 0 to about 40 mol % of the superabsorbent polymer. When calculated with weight ratios, the strong or super strong ionizable backbone monomer is present in an amount less than about 15 wt % of the combined amounts of the neutralized backbone monomer and the un-neutralized backbone monomer. Larger amounts of the strong or super strong ionizable backbone monomer can lead to detrimental effects in the superabsorbent polymer.

In some embodiments, the strong or super strong ionizable backbone monomer is present in an amount greater than about 0 mol %, 0.25 mol %, 0.5 mol %, 1.0 mol %, 1.5 mol %, 2.0 mol %, 2.5 mol %, 3.0 mol %, 3.5 mol %, 4.0 mol %, or 4.5 mol % of the superabsorbent polymer.

In some embodiments, the neutralized backbone monomer is present in an amount greater than about 50 mol %, 55 mol %, 60 mol %, 65 mol %, 70 mol %, 75 mol %, 80 mol %, 85 mol %, 90 mol %, 95 mol %, 96 mol %, 97 mol %, or 98 mol % of the superabsorbent polymer.

In some embodiments, the un-neutralized backbone monomer is present in an amount greater than about 0 mol %, 5 mol %, 10 mol %, 15 mol %, 20 mol %, 25 mol %, 30 mol %, 35 mol %, 36 mol %, 37 mol %, 38 mol %, or 39 mol % of the superabsorbent polymer.

SAMs Copolymerized with Select Metal Salts.

Superabsorbent polymers according to the present disclosure comprise a polymer backbone comprising (i) a neutralized backbone monomer, (ii) a neutralized backbone monomer complexed with a coordination complex comprising a metal ion with an oxidation state of at least 2, (iii) optionally an un-neutralized backbone monomer, and (iv) optionally an un-neutralized backbone monomer, and optionally a crosslinker.

The superabsorbent polymer is copolymerized from select metal salts, a neutralized monomer, an un-neutralized monomer, and optionally a crosslinker. This copolymerized superabsorbent polymer mitigates salt sensitivity to provide significant increases in CRC performance without detrimental impact to other performance attributes such as AUL. It should be understood here that higher AUL can also be reached if the gel strength of the SAMs according to the present disclosure can be enhanced by using well-known techniques such as surface cross-linking of the said SAM particles.

The polymer backbone is random and lacks structured ordering of the neutralized backbone monomer, neutralized backbone monomer complexed with a coordination complex comprising a metal ion with an oxidation state of at least 2, un-neutralized backbone monomer, and un-neutralized backbone monomer. The monomers of the polymer backbone may be arranged in a variety of manners. Individual monomers may be covalently bonded to identical or different monomers.

The superabsorbent polymer does not comprise a block copolymer of the neutralized backbone monomer, neutralized backbone monomer complexed with a coordination complex comprising a metal ion with an oxidation state of at least 2, un-neutralized backbone monomer, and un-neutralized backbone monomer. The superabsorbent polymer also does not comprise an alternating copolymer of the neutralized backbone monomer, neutralized backbone monomer complexed with a coordination complex comprising a metal ion with an oxidation state of at least 2, un-neutralized backbone monomer, and un-neutralized backbone monomer. Finally, the superabsorbent polymer does not comprise a graft copolymer of the neutralized backbone monomer, neutralized backbone monomer complexed with a coordination complex comprising a metal ion with an oxidation state of at least 2, un-neutralized backbone monomer, and un-neutralized backbone monomer.

Figure 2A:
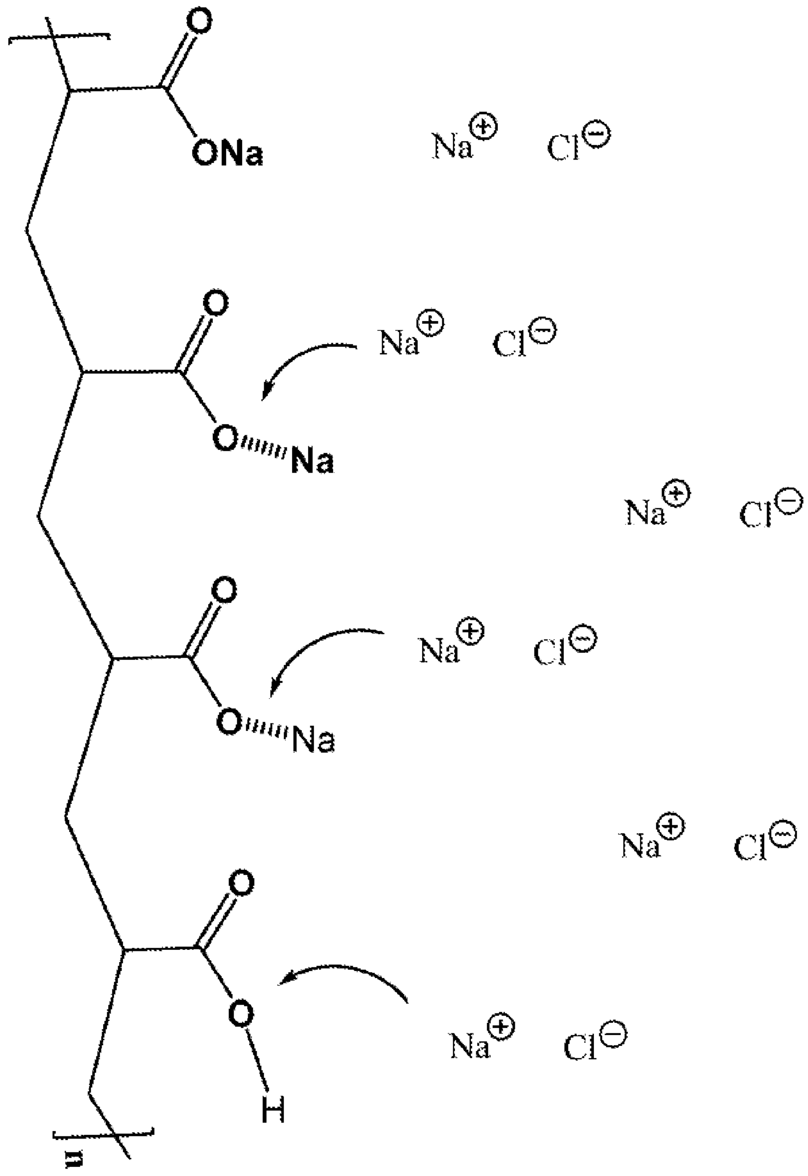
FIG. 2A depicts how external salts screen out chain charges in polymer chains so that the fully dissociated counter ions will decrease and chain expansion will be restricted, which will lead lower osmotic pressure and swelling capacity.
Figure 2B:
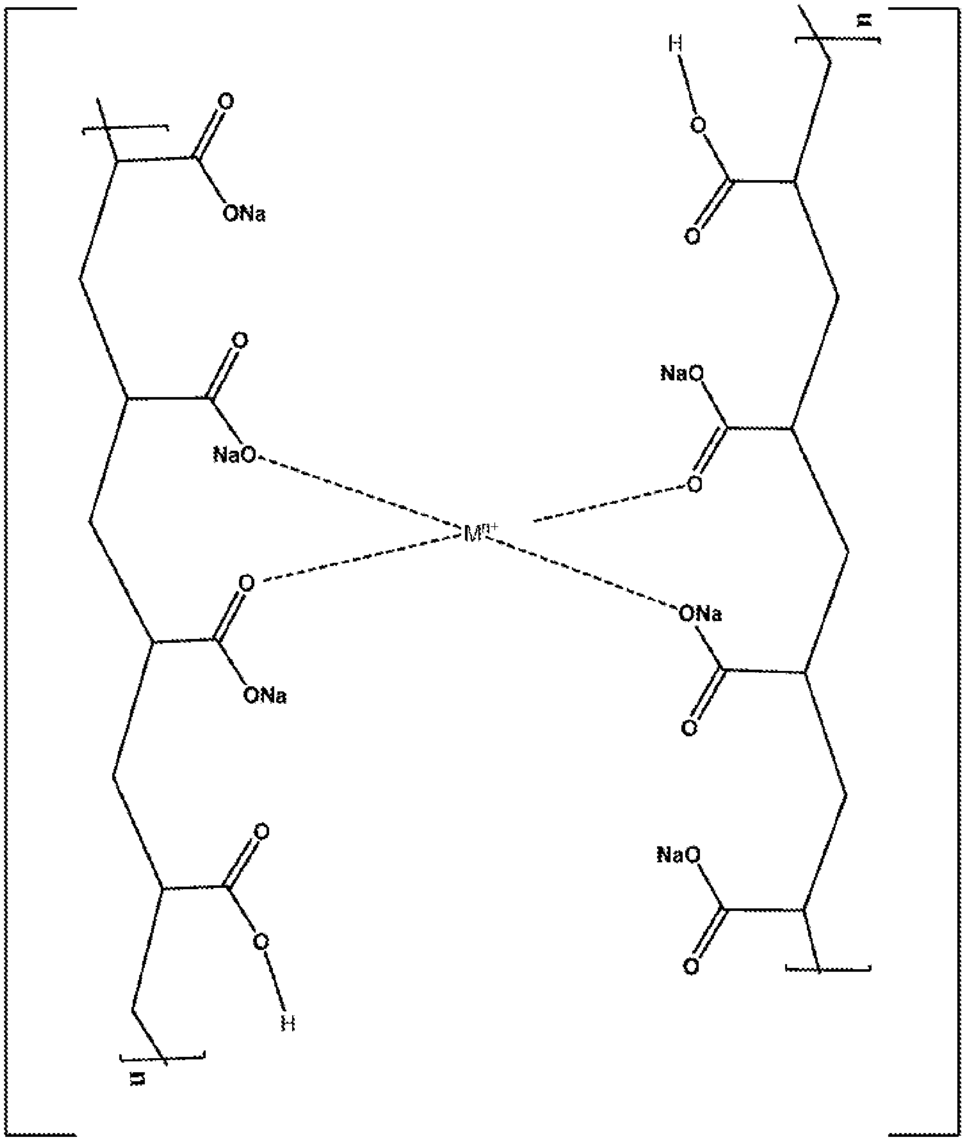
FIG. 2B depicts how external salts form additional crosslinks between polymer chains so that the fully dissociated counter ions will decrease and chain expansion will be restricted, which will lead to lower osmotic pressure and swelling capacity.
Figure 2C:
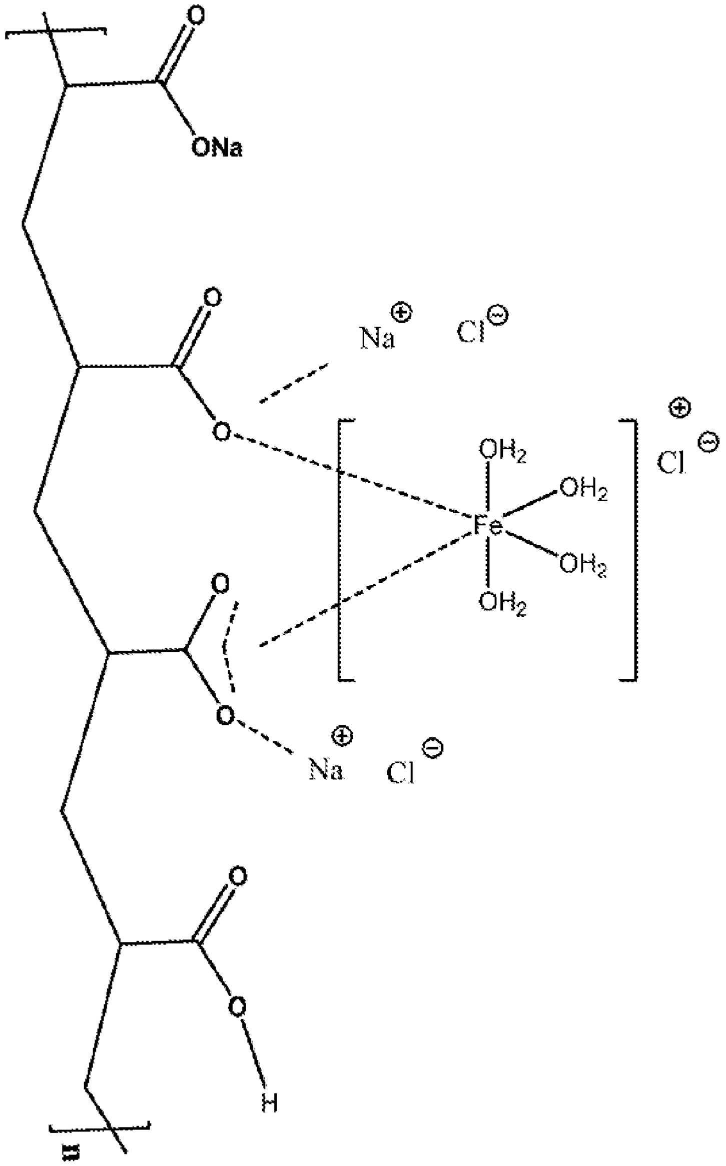
FIG. 2C is an exemplary embodiment in accordance with the present disclosure depicting how metal salts with higher oxidation states, if properly introduced and with no crosslinking complexation between polymer chains, can form complexes with chain charges, which will free chain counter ions to be fully dissociated counter ions. This will increase total particle count and thus lead to higher osmotic pressure and higher swelling capacity.

The select metal salts are generally salts comprising a metal ion with an oxidation state of at least 2, of at least 3, or of at least 4. The use of these select metal salts is based on a critical discovery in the analysis of the interactions of metal salts and SAM polymer chain ion pairs. There is a major difference when a metal salt, particularly metals salts when the metal ion's oxidation state in the salt is higher than two, interacts with the SAM's polymer chain from an external solution and when the same salt is introduced to the polymer chain by forming a metal complex with a monomer before the polymerization. In the former case, the salt approaches the polymer chain's ion pairs as "external" ions and they primarily function as both chain charge screeners (mono counter ions such as $Na^+$ and high oxidation ions such as $Ca^{2+}$ and $Al^{3+}$) and chelating cross-linkers (high oxidation ions such as $Ca^{2+}$, $Al^{3+}$, etc). The screening and chelating effects are much more profound for high oxidation metal ions as they will accumulate on the SAM particle's outer-layers so that the elastic portions of SAM swelling will be significantly restricted and reduced (FIGS. 2A-2B). However, for the latter case, the same high oxidation metal ions, when they first form a complex with a monomer such as AA or AANa and then are polymerized, may actually help to generate more free ions for the polymer chain and thus increase the SAM absorbency, as shown in FIG. 2C. This observation is in agreement with the osmotic pressure theory that the osmotic pressure is directly proportional the total particle counts in a gel system.

These complexed salts are termed "internal" or "intrinsic" metal salts and metal ions.

However, even though SAM absorbency may be increased through the mechanism shown in FIG. 2C, too many internal salts may still be detrimental to the SAM absorbency as they can also function as cross-linkers through chelation. As such, the benefits shown in FIG. 2C can only be achieved and be effective for increasing SAM capacity when the chelation between polymer chains is minimized during polymerization. For this to occur, the loading levels of monomers with complex metal salts must be managed so that the ionization can be maximized while the cross-linking can be minimized. Additionally, only select salts having metals with oxidation states higher than two may be suitable in the present disclosure. This is because high oxidation state salts are more advantageous in forming more free ions than salts with lower oxidation state metal ions. More specifically, metal ions with oxidation states of two (i.e. $M^{2+}$) are more advantageous than metal ions with oxidation states of one (i.e. $M^+$), and metal ions with oxidation states of three or higher (i.e. $M^{\leq 3+}$) are more advantageous than metal ions with oxidation states of two (i.e. $M^{2+}$).

Since very few metal ions are stable when the oxidation state is higher than three, preferred salts are ones with metal ions have the oxidation state at three. Some of the salts with $M^{3+}$ may still not be suitable in the present disclosure if they are prone to forming chelating structures in the aqueous solutions or in polymerization mixtures.

Many inorganic salts have metal ions with oxidation states higher than 2 (i.e. metal halides, sulfates, and nitrates), and could be used to demonstrate the benefits of the present disclosure. However, most of these salts are not readily availability and present safety issues in personal care applications. Accordingly, the metal ions demonstrated herein are commonly found in nature and are associated with biological-related processes. Thus, they are safe or considered to be safe in at least some personal care applications. Regardless, the present disclosure is not intended to be limiting and any inorganic salt having a metal ion with an oxidation state of at least two could be used in the present disclosure.

The select metal salts in accordance with the present disclosure include metal ions that can form coordination complexes with monomers in the pre-polymerization mixture; these structures will be part of the SAM's polymer chain or chain networks after copolymerization. The structures of the coordination complexes depend in part on the coordination number of the metal ion. The coordination number of a metal is largely dictated by how many donor atoms can fit around the metal, which in turn is controlled by size. Regarding transition metals, the later transition metals are smaller than the earlier ones. On crossing the 3d transition series, nuclear charge and atomic number increase, but the screening due to filled electronic shells stays the same. This draws the outer electrons in closer, so that the atoms and ions become progressively smaller. For zinc, the last and smallest of the 3d metals, four is the most common coordination number. Thus, later transition metals generally form smaller complexes than earlier transition metals.

Figure 4A:
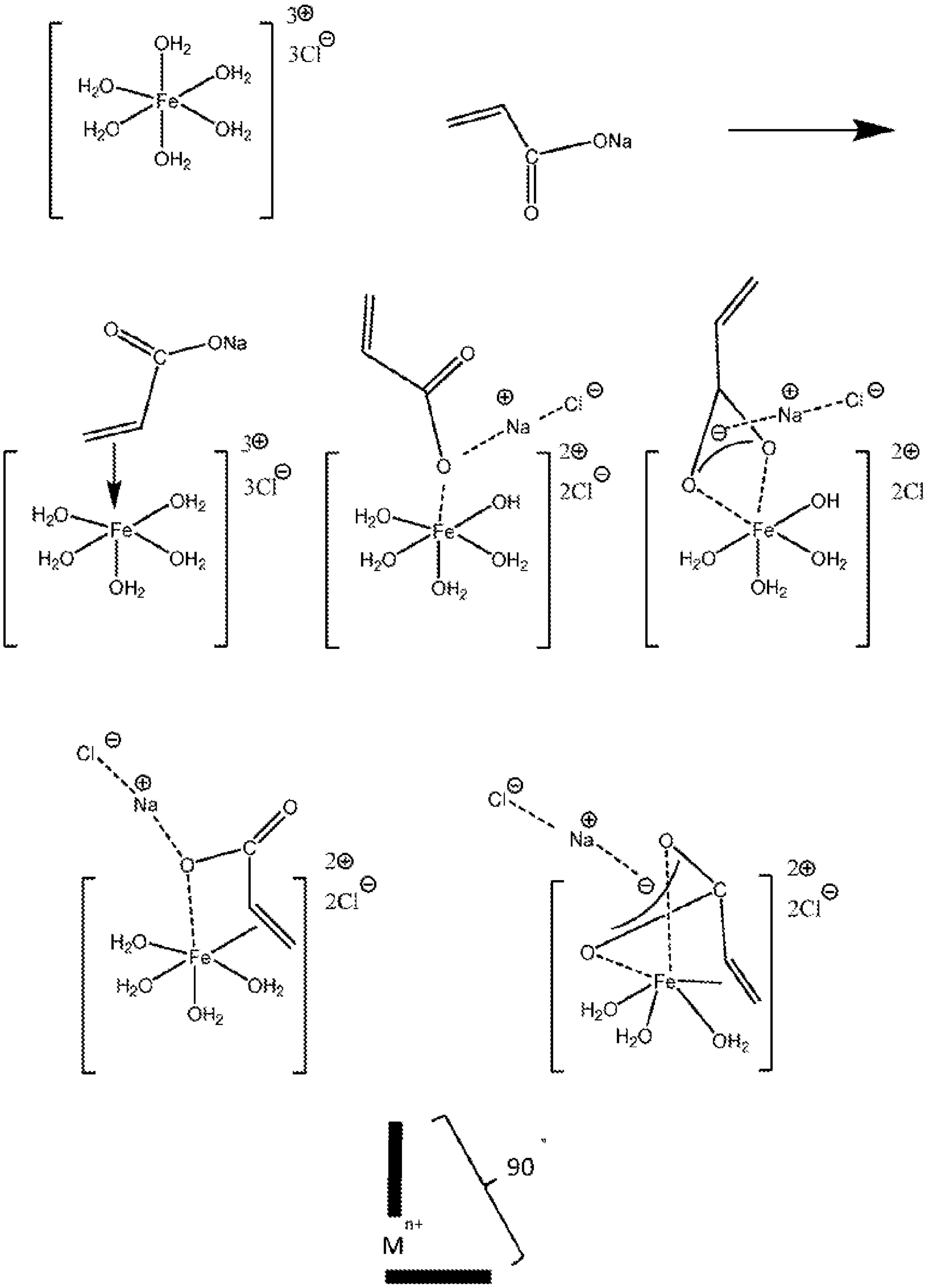
FIG. 4A is an exemplary embodiment in accordance with the present disclosure depicting coordination modes of Fe(III) chloride with a vinyl carboxylate sodium salt monomer.
Figure 4B:
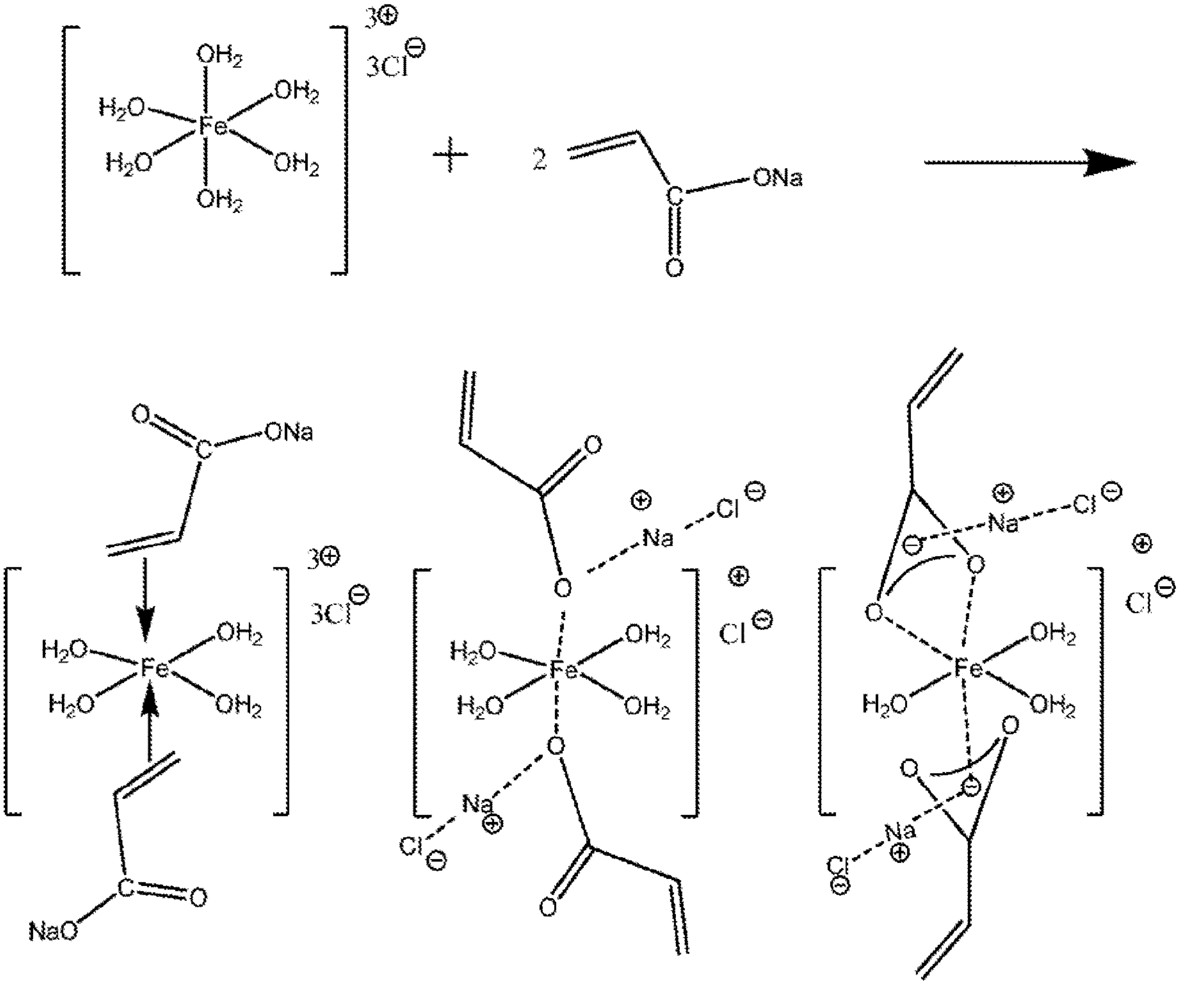
FIG. 4B is an exemplary embodiment in accordance with the present disclosure depicting coordination modes of two iron (III) complexes with a vinyl carboxylate sodium salt monomer.
Figure 4B:
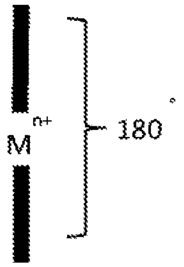
Figure 4C:
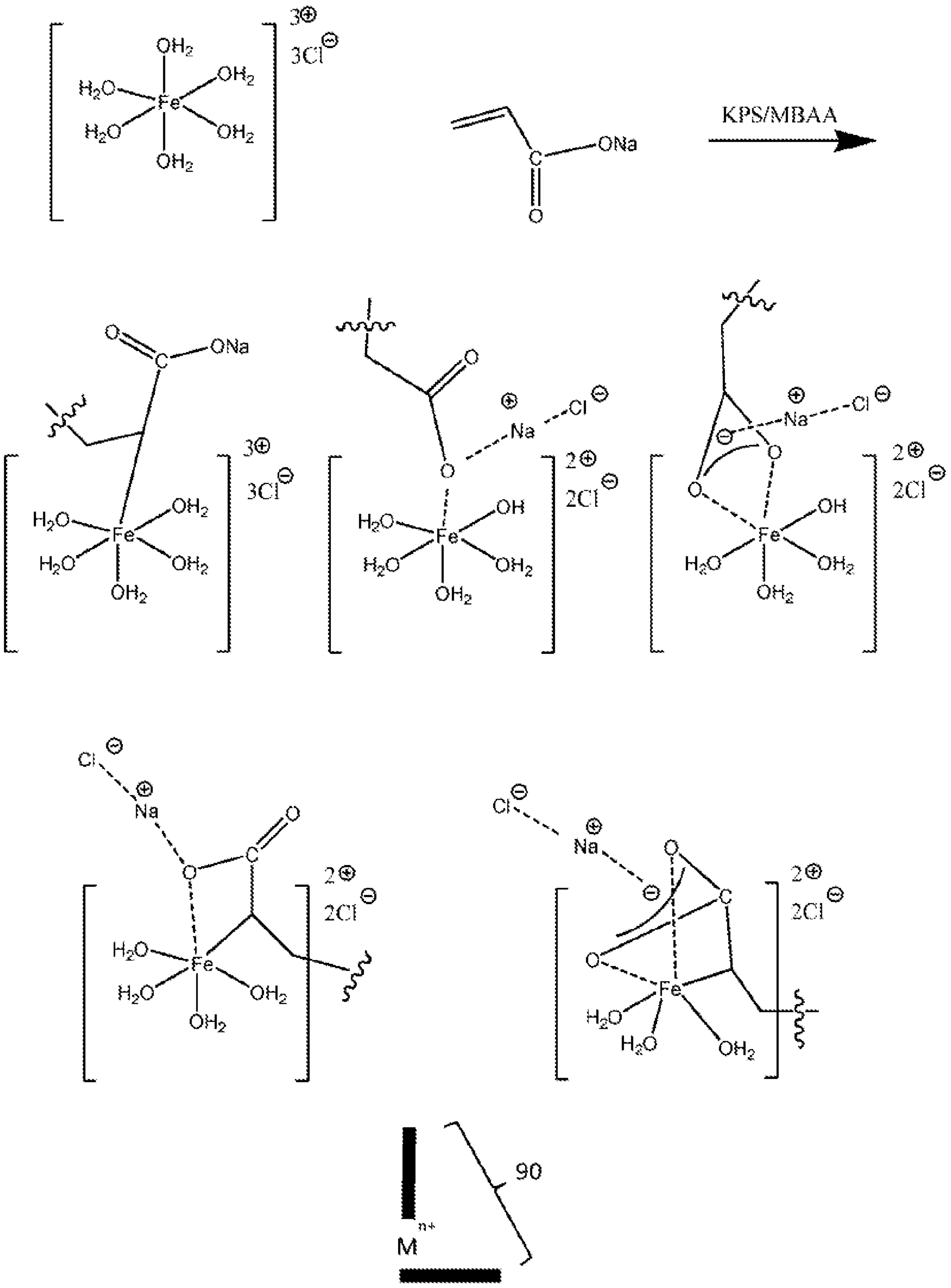
FIG. 4C is an exemplary embodiment in accordance with the present disclosure depicting a single iron (III) complex in a polymerized carboxylate sodium salt.
Figure 4D:
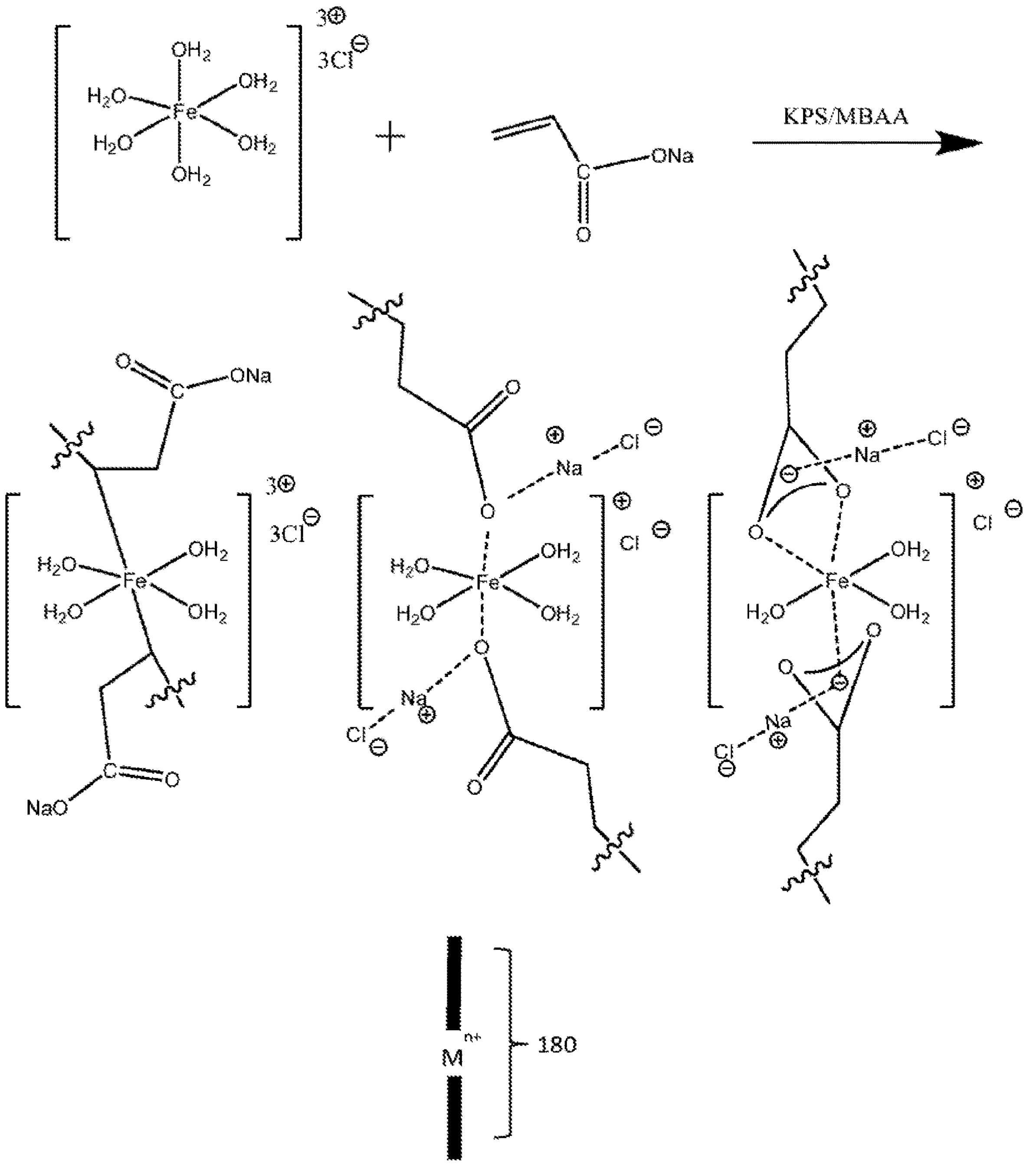
FIG. 4D is an exemplary embodiment in accordance with the present disclosure depicting a bidentate iron (III) complex after polymerization with a vinyl carboxylate sodium salt.

In some embodiments, the coordination complex comprising a metal ion with an oxidation state of at least 2 coordinates with more than one neutralized or un-neutralized backbone monomer. It is conceivable that a monomer complex with more than one neutralized or un-neutralized backbone monomer or combinations thereof can start one or two or more polymer chains. For example, in some embodiments, two polymers from one complex may have an initial geometry angle of 90 degrees (FIG. 4C) while in some other embodiments, the angle can be 180 degrees (FIG. 4D). Because of these geometry restrictions by the coordinated metal center ion, the SAMs materials with such structures will lead to more advantageous gel properties such as improved gel rigidity and mechanical properties.

Figure 5:
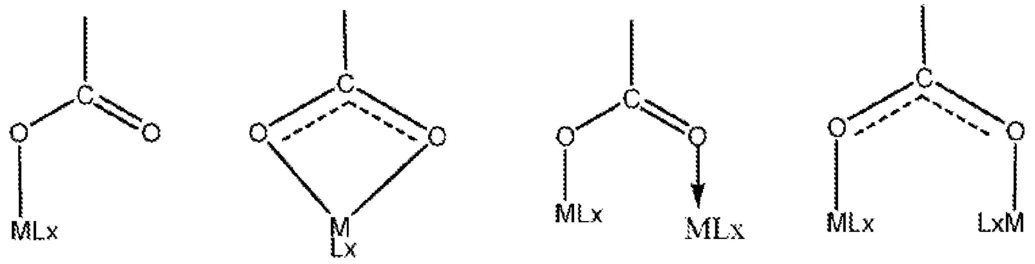
FIG. 5 depicts different interaction modes between a carboxylate and a metal salt. Charges are excluded for visual clarity.

As depicted in FIGS. 4A-4D, the coordination modes between a monomer and a selected salt can have two major modes, e.g. one is the coordination between the monomer's alkene double bond and a metal center while another one is the coordination between the carboxylate side of the monomer and a metal center. The coordination between the carboxylate and a metal center is more complex compared to alkene double bond coordination because it can assume different modes, as shown in FIG. 5. It is conceivable that such different coordination modes can form before the polymerization at the monomer complex stage and some of such initial simple complexes can form more complexed structures during the polymerization process and even later stages, such as during the drying processes. It is also conceivable that such different interactions can happen within a single polymer chain or among different chains to form a network. For the purpose of ionization enhancement, the network formation through different chains here is not desirable and should be minimized as it will function as a cross-linking agent for cancelling the ionization.

Because the formation of the different coordination modes and different selected metal salts may prefer one or more modes over others, it should be understood here that those skilled in the art can fine-tune polymerization and processing conditions for a given selected salt so that the maximized capacity enhancement can be reached. It is also conceivable that in some cases, CRC enhancement may be more profound, like the polymerization conditions of the present disclosure, than AUL enhancement. In other cases, AUL enhancement may be more profound than CRC increases. In still other cases, both CRC and AUL increases can be achieved.

Transition metals are particularly advantageous in the present disclosure because of their numerous oxidation states and coordination complexes. In some embodiments, the coordination complex comprises a metal ion selected from the group consisting of transition metals. Preferably, the coordination complex comprises a metal ion selected from the group consisting of row 1 and row 2 transition metals. The most preferred transition metal ions are selected from the group consisting of row 1 transition metals and combinations thereof.

In some embodiments, the coordination complex comprises a metal ion selected from the group consisting of $Ca^{2+}$, $Co^{2+}$, $Zn^{2+}$, $Mn^{2+}$, $Al^{3+}$, $Fe^{3+}$, $Co^{3+}$, $Mn^{3+}$, $Ru^{3+}$, and combinations thereof. In some embodiments, the coordination complex comprises a complex selected from the group consisting of $ML_x^{2+}$, $ML_x^{3+}$, and combinations thereof, wherein L is an organic ligand and M is a metal ion selected from the group consisting of $Ca^{2+}$, $Co^{2+}$, $Zn^{2+}$, $Mn^{2+}$, $Al^{3+}$, $Fe^{3+}$, $Co^{3+}$, $Mn^{3+}$, $Ru^{3+}$, and combinations thereof.

In some embodiments, the coordination complex comprising a metal ion with an oxidation state of at least 2 coordinates with more than one neutralized or un-neutralized backbone monomer. Coordination with more than one neutralized or un-neutralized backbone monomer can occur along the same or different polymer chains.

Figure 3:
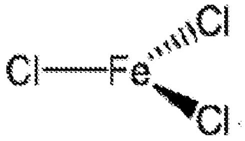
FIG. 3 depicts $FeCl_3$ and its hydrated forms in water.
Figure 3:
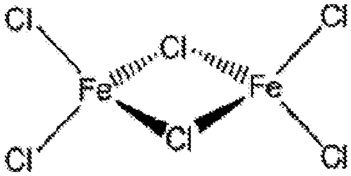
Figure 3:
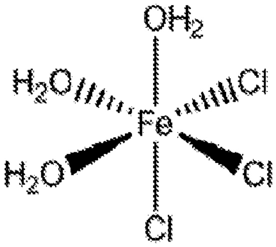
Figure 3:
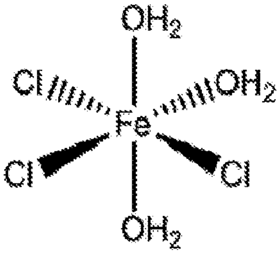
Figure 3:
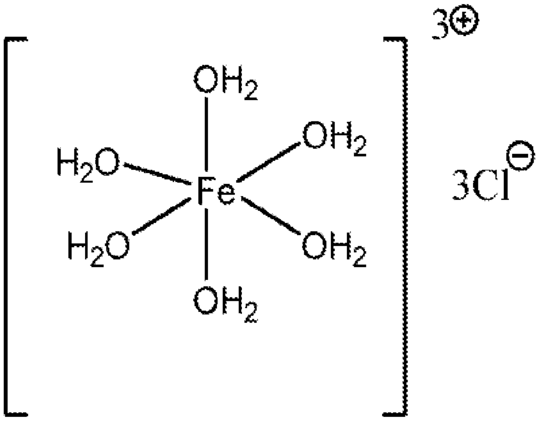
Figure 6:
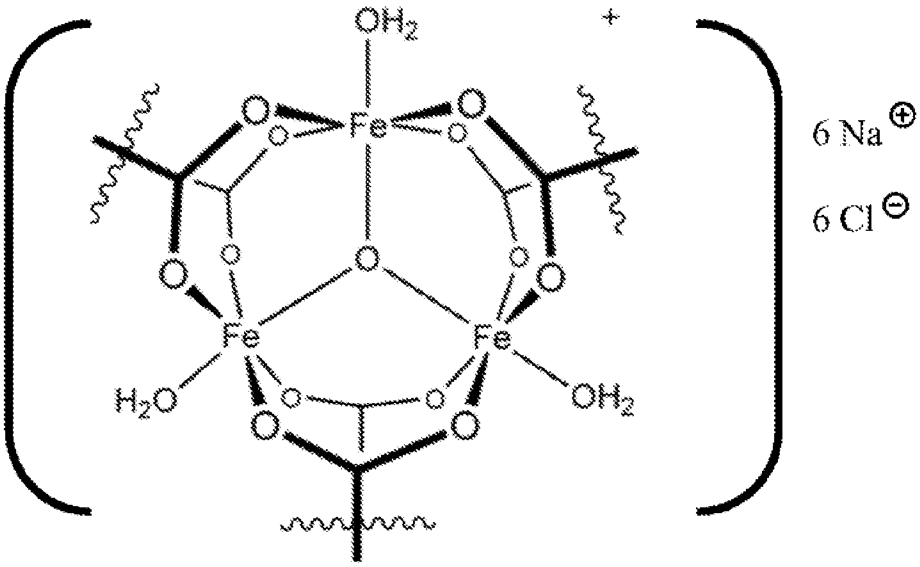
FIG. 6 is an exemplary embodiment in accordance with the present disclosure depicting a cluster iron (III) complex after polymerization with a vinyl carboxylate sodium salt.
Figure 7:
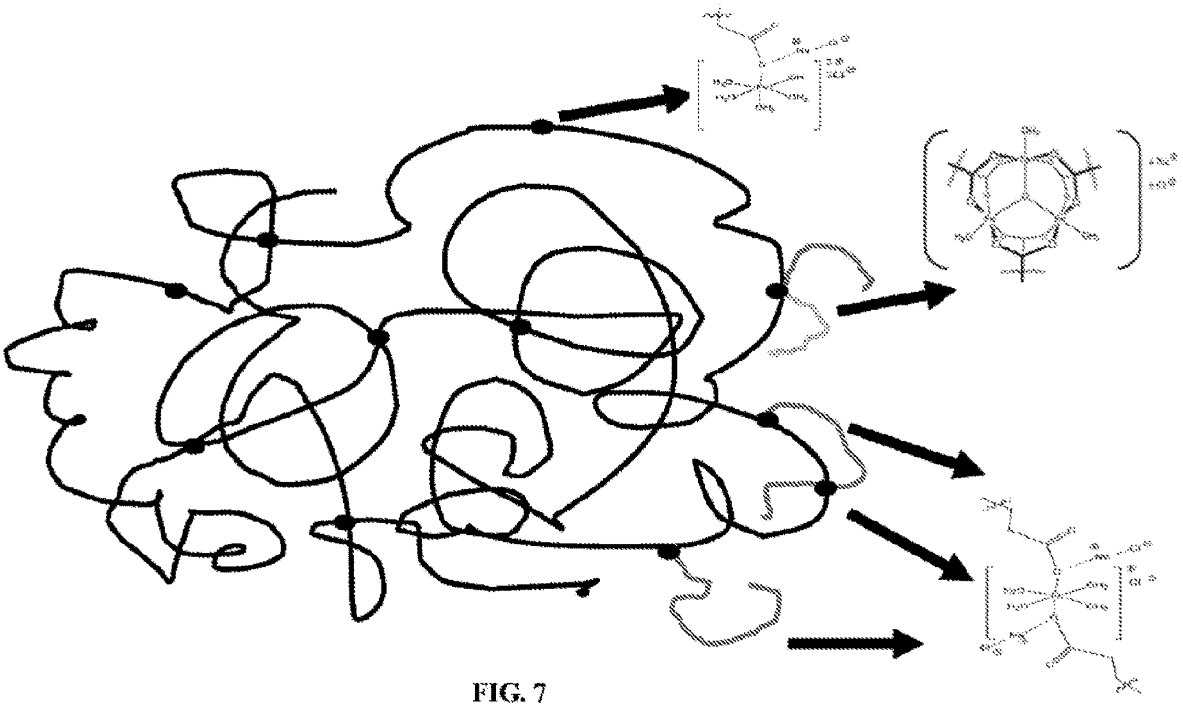
FIG. 7 is an exemplary embodiment in accordance with the present disclosure depicting a topological illustration of different iron (III) complexes after polymerization with a vinyl carboxylate sodium salt.

An especially preferred metal salt is $FeCl_3$. $FeCl_3$ is particularly effective and inexpensive. $FeCl_3$ exists in a number of hydrated coordinated complex forms in water (FIG. 3). The hydrated forms can form monodentate complexes, bidentate complexes, and even higher multidentate complexes from monomers and they can be retained and become the source units for more free ions in polymerized SAMs (FIGS. 4A-4D). At the maximum, the hydrated forms can form a cluster complex after polymerization with SAM monomers and such cluster complexes are known in the literature (FIG. 6). The combined interactions with different iron (III) complexes after polymerization with SAM monomers is depicted in FIG. 7. As depicted and described herein, the select metal salts can improve the salt sensitivity of SAMs through a variety of mechanisms, mainly through increase the free ions when they are directly incorporated into the SAM's polymer chains and chain networks as intrinsic internal salts.

Although not specifically targeted, the SAMs with metal ions might have other advantageous properties over SAMs without coordinated metal ions. For example, charged metal centers are well-known for trapping or killing bacteria, and such properties are extremely desirable for personal garments such as diapers and pants and feminine pads. In another aspect, metal ions are also known to absorb various odor molecules such as ammonia, amines, and sulfur compounds. These odor compounds are well known to be present in physiologically fluids such as in urine, blood, sweat, etc. In a further aspect of the invention, the metal ions in the polymer chains and chain networks can function as the starting points of degradation for faster decomposition in nature or an engineered process that can accelerate the decomposition process such as by light radiation (e.g. commonly known as an OXO-biodegradation process). As such, SAMs with coordinated metal ions might be advantageous over other SAMs at least for their better biodegradability.

Generally, the neutralized backbone monomer is present in an amount in the range of from about 50 to about 99 mol % of the superabsorbent polymer, the neutralized backbone monomer complexed with a coordination complex comprising a metal ion with an oxidation state of at least 2 is present in an amount in the range of from about 0.001 to about 0.3 mol % of the superabsorbent polymer, the un-neutralized backbone monomer is present in an amount in the range of from about 0 to about 40 mol % of the superabsorbent polymer, and the un-neutralized backbone monomer complexed with a coordination complex comprising a metal ion with an oxidation state of at least 2 is present in an amount in the range of from about 0.001 to about 0.3 mol % of the superabsorbent polymer. Larger amounts of the neutralized backbone monomer complexed with a coordination complex comprising a metal ion with an oxidation state of at least 2 can lead to detrimental effects in the superabsorbent polymer. In some embodiments, the preferred total amount of neutralized and unneutralized monomers with coordinated selected salts are in the range of from about 0.01 mol % to about 0.3 mol % of the end polymer.

In some other embodiments, the preferred total amount of neutralized and unneutralized monomers with coordinated selected salts are in the range of from about 0.01 mol % to about 0.15 mol % of the end polymer. In some further embodiments, the preferred total amount of neutralized and unneutralized monomers with coordinated selected salts are in the range of from about 0.01 mol % to about 0.1 mol % of the end polymer. In some other embodiments, the preferred total amount of neutralized and unneutralized monomers with coordinated selected salts are in the range of from about 0.01 mol % to about 0.05 mol % of the end polymer.

In some embodiments, the neutralized backbone monomer is present in an amount greater than about 50 mol %, 55 mol %, 60 mol %, 65 mol %, 70 mol %, 75 mol %, 80 mol %, 85 mol %, 90 mol %, 95 mol %, 96 mol %, 97 mol %, or 98 mol % of the superabsorbent polymer.

In some embodiments, the un-neutralized backbone monomer is present in an amount greater than about 0 mol %, 5 mol %, 10 mol %, 15 mol %, 20 mol %, 25 mol %, 30 mol %, 35 mol %, 36 mol %, 37 mol %, 38 mol %, or 39 mol % of the superabsorbent polymer.

In some embodiments, the sum of the wt % of the neutralized backbone monomer complexed with a coordination complex comprising a metal ion with an oxidation state of at least 2 and the wt % of the un-neutralized backbone monomer complexed with a coordination complex comprising a metal ion with an oxidation state of at least 2 is less than about 0.2%, less than about 0.075%, less than about 0.050%, and less than about 0.025%, and less than 0.01% of the total wt % of the polymer backbone.

Mutual Aspects.

The two categories of SAMs disclosed herein share commonalities for a variety of aspects, such as form, monomers, crosslinkers, general synthesis procedures, and applications. These aspects are described in detail herein with the understanding that any aspect may be applied to one or both of the categories of SAMs.

The superabsorbent polymer can take a variety of forms depending on the ultimate application. In some embodiments, the superabsorbent polymer is in a form selected from the group consisting of a particle, a gel, a fiber, a bead, a liquid, a solid, a paste, or combinations thereof. In some particular embodiments, the superabsorbent polymer is a gel or a particle, and preferably in the form of particles.

In some embodiments, the superabsorbent polymer is in a form with a diameter in the range of about 100 μm to about 1000 μm, about 100 μm to about 900 μm, about 100 μm to about 800 μm, about 100 μm to about 700 μm, about 100 μm to about 600 μm, about 100 μm to about 500 μm, about 100 μm to about 400 μm, about 100 μm to about 300 μm, or about 100 μm to about 200 μm. In some embodiments, the superabsorbent polymer is in a form with a diameter in the range of about 200 μm to about 900 μm, about 300 μm to about 800 μm, about 300 μm to 600 μm, about 400 μm to about 700 μm, or about 500 μm to about 600 μm.

In some particular embodiments, the superabsorbent polymer is in a form with a diameter in the range of about 300 μm to about 600 μm.

In many embodiments, the superabsorbent polymer exhibits substantially improve absorbency and salt sensitivity properties without crosslinking. However, crosslinkers may be used to further enhance the properties of the superabsorbent polymers. The superabsorbent polymer may comprise one, two, or more crosslinkers.

In some embodiments, the superabsorbent polymer comprises a crosslinker selected from the group consisting of methylene(bis) acrylamide (MBAA), poly(ethylene glycol diacrylate) (PEGDA), ethylene glycol diacrylate (EGDA), ethylene glycol dimethacrylate (EGDMA), poly(ethylene glycol dimethacrylate) (PEGDMA), and combinations thereof.

In some embodiments, the superabsorbent polymer is lightly crosslinked. In some embodiments, the superabsorbent polymer has a crosslinker density in the range of about 0.1 mol % to about 2.0 mol %. In some embodiments, the superabsorbent polymer has a crosslinker density in the range of about 0.2 mol % to about 2.0 mol %. In some embodiments, the superabsorbent polymer has a crosslinker density in the range of about 0.5 mol % to about 2.0 mol %. In some embodiments, the superabsorbent polymer has a crosslinker density in the range of about 1.0 mol % to about 2.0 mol %. In some embodiments, the superabsorbent polymer has a crosslinker density in the range of about 1.5 mol % to about 2.0 mol %.

The neutralized backbone monomer and the un-neutralized backbone monomer are each individually selected according to the ultimate application of the superabsorbent polymers. Monomers known in the art to be used in superabsorbent polymers are suitable as the neutralized backbone monomer and the un-neutralized backbone monomer. The neutralized backbone monomer and the un-neutralized backbone monomer may be neutralized and un-neutralized forms of the same monomer or neutralized and un-neutralized forms of different monomers.

In some embodiments, the neutralized backbone monomer and the un-neutralized backbone monomer are each individually selected from the group consisting of acrylic acids, methacrylic acids, vinyl sulfonic acids, vinyl phosphoric acids, partially hydrolyzed maleic anhydrides, and combinations thereof.

The superabsorbent polymer may be synthesized according to a variety of random polymerization methods known in the art. Such methods include free radical polymerization, anionic polymerization, controlled radical polymerization methods, atom-transfer radical-polymerization (ATRP), nitroxide mediated radical polymerization (NMP), reversible addition-fragmentation chain-transfer polymerization (RAFT), and combinations thereof.

In some embodiments, the copolymer is synthesized according to free radical polymerization. In these embodiments, the free radicals may be generated by photolysis, thermal decomposition, or ambient redox conditions.

Disclosed herein is a method of making a superabsorbent polymer comprising a polymer backbone comprising (i) a strong or super strong ionizable backbone monomer comprising an anion of a strong organic acid and a super ionizable counter ion, (ii) a neutralized backbone monomer, and (iii) optionally an un-neutralized backbone monomer, and optionally a crosslinker. The method comprises (i) forming a mixture comprising a solvent, a monomer, a compound comprising a strong organic acid anion and a super ionizable counter ion, and optionally a crosslinker; (ii) initiating a reaction; and (iii) reacting the mixture.

Also disclosed herein is a method of making a superabsorbent polymer comprising a polymer backbone comprising (i) a neutralized backbone monomer, (ii) a neutralized backbone monomer complexed with a coordination complex comprising a metal ion with an oxidation state of at least 2, (iii) optionally an un-neutralized backbone monomer, (iv) optionally an un-neutralized backbone monomer complexed with a coordination complex comprising a metal ion with an oxidation state of at least 2, and (v) optionally a crosslinker. The method comprises (i) forming a mixture comprising a solvent, a monomer, a salt comprising a metal ion with an oxidation state of at least 2, and optionally a crosslinker; (ii) initiating a reaction; and (iii) reacting the mixture.

The method step of initiating a reaction may implement standard materials and procedures known in the art, including adding an initiator, an accelerator, or a combination thereof to the mixture. In some particular embodiments, the initiator is an oxidizing agent.

The initiator may be an organic compound. In some embodiments, the initiator is selected from the group consisting of azo compounds, organic peroxide compounds, organic persulfate compounds, and combinations thereof.

The initiator may be an inorganic compound. In some embodiments, the initiator is selected from the group consisting of inorganic peroxide compounds. In some particular embodiments, the initiator is selected from the group consisting of potassium persulfate, ammonium persulfate, and combinations thereof.

Some reactions may proceed at a suitable rate without an accelerator. When an accelerator is used, the accelerator is an organic compound. In some embodiments, the accelerator is selected from the group consisting of organic compounds, organic bases, tetramethylethylenediamine (TEMED), sodium metabisulfite (SPS), no accelerator, and combinations thereof.

An inert atmosphere improves the reaction by limiting oxidation by air. Inert atmospheres can be static or dynamic. When the inert atmosphere is dynamic, an inert gas is continually flowed over the reactants. The inert atmosphere comprises a chemically inert gas. In some embodiments, the inert atmosphere is selected from the group consisting of $N_2$, $CO_2$, noble gases, helium, neon, argon, krypton, xenon, and combinations thereof. In some particular embodiments, the method step of reacting the mixture comprises reacting the mixture in an inert atmosphere of $N_2$.

In many embodiments, the method step of reacting the mixture comprises heating the mixture. The mixture may be heated to any temperature that facilitates reaction. In some embodiments, the method step of reacting the mixture comprises heating the mixture to a temperature in the range of about 20° C. to about 100° C. In some particular embodiments, the method step of reacting the mixture comprises heating the mixture to a temperature in the range of about 40° C. to about 70° C.

In some embodiments, the method further comprises drying the reaction product. The reaction product may be dried in an oven or with other known means of drying. Drying temperatures and times may be varied according to the relative moisture content and properties of the reaction product. In some embodiments, the method further comprises drying the reaction product at a temperature in the range of about 50° C. to about 100° C. In some particular embodiments, the method further comprises drying the reaction product at a temperature in the range of about 70° C. to about 90° C.

In some embodiments, the method further comprises grinding the reaction product. The reaction product is ground to break the reaction product down to desired particle sizes. Suitable methods are known in the art. In some embodiments, the method further comprises grinding the reaction product with a grinding device selected from the group consisting of a mechanical blender, coffee grinder, a crusher, a pulveriser, a grinder, a mill, and combinations thereof.

In another aspect of the invention, the particles as described in the current invention can undergo further treatment according to well-known procedures such as particle surface cross-linking. The proper selected surface cross-linking agents can enhance the particle mechanical strength as well as helping to control intake speed, improve gel permeability, and fluid distribution between the particles and inside of the given particle.

Regarding the properties of the final superabsorbent polymers, the ability of a polymer to absorb fluid under a static load can be measured as absorbance under load (AUL). A typical AUL test format may be used. The capacity of a pre-swollen polymer to retain water under force can be measured as centrifuge retention capacity (CRC). A typical CRC test format may be used.

Consumer products or superabsorbent materials may comprise the superabsorbent polymers in accordance with the present disclosure. The superabsorbent polymer may also be used in a consumer product or a superabsorbent material.

Suitable consumer products include, but are not limited to, personal hygiene products, wipes, napkins, bibs, disposable bed liners, wound dressings, food packaging, baby and adult diaper products, child training pants, feminine pads and napkins, arm bands, agricultural and pet products that contain superabsorbent ingredients, disposable absorbent products, and combinations thereof.

EXAMPLES

Without further elaboration, it is believed that one skilled in the art using the preceding description can utilize the present invention to its fullest extent. The following Examples are, therefore, to be construed as merely illustrative, and not limiting of the disclosure in any way whatsoever.

SAMs Copolymerized with Strong or Super Strong Ionizable Monomers and Bulky Counter Ions.

The following examples are used to demonstrate the feasibility of using co-polymerized SAMs. Select salts (e.g. vinyl sulfonic acid salts with sodium ions and various bulky counter ions such as tetra-alkyl ammonium) were copolymerized with acrylic acid sodium salt (e.g. the primary component of the current base monomer for commercial SAMs). Samples synthesized without these salts under identical polymerization conditions were used as controls.

Comparative Example 1. Preparation of PAA-Based SAM Particles without Strong or Super Strong Ionizable Monomers 10 grams of acrylic acid (AA) monomer is added to a glass reaction flask (e.g. a 120 mL wide mouth round jar, a beaker, or a round bottom flask) with a magnetic stir bar. The glass reaction flask should be equipped with a seal cap or a glass or rubber stopper. About 35 to 40 mLs of deionized (DI) water is added to the glass reaction flask with AA monomer and then cooled down to about 0° C. with an ice water bath. The amount of water is added to produce the monomer concentration at about 20% for the polymerization solutions. NaOH pellets, or a NaOH solution, having greater than 97% concentration is added to the cold solution. Then the mixture is stirred with a magnetic stirrer or other proper mixing tools until the NaOH pellets were fully dissolved. For 70% neutralization, about 3.89 grams of NaOH will be added to 10 grams of AA monomer.

If desired, an initiator (about 15-30 mg of 99.99% Potassium Persulfate (KPS)) and a cross-linker (about 10-45 mg of greater than 99% MBAA (N,N-MethyleneBis(Acrylamide)) may be added to the cold neutralized AA solution in DI-water.

The mixture is rigorously degassed with either high purity nitrogen or argon to remove trapped air in the reaction mixture and also replace the air in the glass reaction flask. At least 3-10 minute degassing times are recommended. After the degassing step, the glass reaction flask is sealed and transferred to a pre-heated water bath (e.g. about 40-90° C.) equipped with a magnetic stirrer to start the polymerization process. Alternatively, the reaction mixture can be heated up from ice bath temperature to the desired polymerization temperature gradually. The gelling time is monitored (e.g. by determining when the magnetic stir bar stops stirring or there is no movement of the gelling mixture). After gelling, the gel remains in the heating bath for an additional 14 hours to ensure the completion of the polymerization.

After polymerization, the gel is removed from the glass reaction flask. A knife or a scissor is used to cut the big gel block into small chunks for easy drying. A blender can be used for breaking up the big gel block to small pieces. After cutting, the resulted gel chunks are dried in an 85° C. oven for at least 24-48 hours. The drying can also be done by using a vacuum oven at about 65° C. The drying can also be done by accelerated drying procedures, with air dryers, with desired oven temperatures, with hot air flows, and combinations thereof. The drying process can also be performed through a dynamic belt system with a combination of heat, vacuum, and through air drying techniques.

Dried gel chunks are then placed into a coffee blender or any suitable particle processing tool for breaking down to desired particle sizes. US Standard sieves are used to collect particles with desired size ranges (e.g. 300-600 microns). Optionally, the sieved particles are dried again at 85° C. overnight (or 24 hours) or dried with accelerated drying by vacuum, air drying, or combinations thereof under desired temperatures and drying conditions Example 1. Preparation of PAA-based SAM Particles with Ionizable Monomers The reaction procedure of Comparative Example 1 is followed, with the exception that 0-1.5 grams of a strong or super strong ionizable monomer salt (e.g. vinyl sulfonic acid sodium saft or vinyl sulfonic acid tetra alkyl ammonium salts) is added to the glass reaction flask at the same time as the acrylic acid (AA) monomer. The said vinylsulfonic acid tetraalkylammonium salts in this Example were freshly prepared by mixing equal molar amounts of vinylsulfonic acid and tetra alkyl ammonium hydroxide in 2-5 mLs of deionized water at ice bath temperature and then adding this mixture to an acrylic acid aqueous mixture. The alkyl groups here include methyl groups, ethyl groups, butyl groups, and combinations thereof.

Example 2. Absorbency Under Load (AUL) Measurements of SAM Particles

AUL measures the ability of a polymer to absorb fluid under a static load and can be considered as a measurement of gel swelling coupled with gel strength. A typical AUL test format was used, consisting of a simple cylindrical device with a macro-porous sintered filter plate at one end of a sintered plastic cylinder. For the samples tested, 160 mg ($W_1$) of the dried SAP sample was weighed and evenly placed on the surface of polyester gauze placed on top of the sintered plastic. The desired load (e.g. a weight that can generate pressures of 0.3-0.9 PSI) was then placed on top of the dry SAP particles, with the load designed so it can freely move in the plastic cylinder. The device was placed in a petri dish of 0.9% saline solution on the top of a mesh (to ensure that water can access the bottom of the sintered plastic) for 1-72 hours or any desired measurement times. The swollen sample was weighed ($W_2$), and the AUL was calculated using Equation 4:

$$AUL\left(\frac{g}{g}\right) = \frac{w_2 - w_1}{w_1}. \quad \text{(Equation 4)}$$

Example 3. Centrifuge Retention Capacity (CRC) Measurements of Sam Particles

In contrast to AUL testing, in which a dry powder of SAP is hydrated under load, a CRC test measures the capacity of a pre-swollen SAP to retain water under force. To perform the test, about 100 to 200 mg ($W_1$) of the dried SAP sample was weighed into a pre-weighed tea bag. The tea bag was immersed in 0.9 saline solution for 1-2 hours or any desired length of testing times to swell the SAP. Subsequently, the tea bag was placed inside a cylindrical centrifuge tube containing a porous inside to allow for water drainage and centrifuged for 3 minutes at 1600 rpm. As a control, an empty tea bag also was put in saline and centrifuged at the same speed. After centrifugation, the tea bag was weighed again ($W_2$), and the difference between the dried and swollen sample was calculated. The CRC amount was calculated by Equation 5:

$$CRC\left(\frac{g}{g}\right) = \frac{w_2 - w_1}{w_1}. \quad \text{(Equation 5)}$$

Example 4. AUL and CRC Results of Synthesized Polymers

The swelling results, namely absorption under load (AUL) and centrifuge retention capacity (CRC), for the prepared polymers of Comparative Example 1 and Example 1 are presented in Table 1. For comparison, the CRC of Evonik 5630 is about 32.1 g/g. AUL was measured according to the procedures of Example 2 and CRC was measured according to the procedures of Example 3.

TABLE 1

Co-Polymerized AA and $VSO_3Na$ in 0.9% NaCl.

| AA (g) | $VSO_3Na$ (g) | CRC (g/g) (2 hrs) | CRC Increase (%) |
|---|---|---|---|
| 10 | 0.00 | 41.4 | Control |
| 10 | 0.25 | 45.3 | 10.5 |
| 10 | 0.50 | 48.2 | 17.8 |
| 10 | 0.75 | 48.8 | 19.1 |
| 10 | 1.00 | 48.5 | 18.2 |

TABLE 2

Co-Polymerized AA and $VSO_3NMe_4$ in 0.9% NaCl.

| AA (g) | $VSO_3NMe_4$ (g) | CRC (g/g) (2 hrs) | CRC Increase (%) | AUL (g/g) (>72 hours) |
|---|---|---|---|---|
| 10 | 0.00 | 41.4 | Control | 26.0 |
| 10 | 0.25 | 45.9 | 10.8 | 26.5 |
| 10 | 0.50 | 48.5 | 17.0 | 27.3 |
| 10 | 1.00 | 51.6 | 24.5 | 25.7 |
| 10 | 1.50 | 53.7 | 29.6 | 26.2 |

TABLE 3

Co-Polymerized AA and $VSO_3Nt_4$ in 0.9% NaCl.

| AA (g) | $VSO_3Nt_4$ (g) | CRC (g/g) (2 hrs) | CRC Increase (%) | AUL (g/g) (>72 hours) |
|---|---|---|---|---|
| 10 | 0.00 | 41.4 | Control | 26.0 |
| 10 | 0.25 | 44.3 | 6.9 | 26.9 |
| 10 | 0.50 | 47.9 | 15.6 | 27.8 |
| 10 | 1.00 | 51.8 | 25.0 | 27.9 |
| 10 | 1.50 | 53.0 | 27.9 | 25.9 |

TABLE 4

Co-Polymerized AA and $VSO_3NBu_4$ in 0.9% NaCl.

| AA (g) | $VSO_3NBu_4$ (g) | CRC (g/g) (2 hrs) | CRC Increase (%) | AUL (g/g) (>72 hours) |
|---|---|---|---|---|
| 10 | 0.00 | 41.4 | Control | 26.0 |
| 10 | 0.25 | 51.1 | 24.8 | 27.8 |
| 10 | 0.50 | 51.4 | 24.0 | 27.2 |
| 10 | 1.00 | 48.8 | 18.2 | 26.4 |
| 10 | 1.50 | 47.1 | 13.8 | 24.9 |

Varying degrees of cross-linker were added during the copolymerization process to determine the impact of cross-linking density on CRC. It was determined that copolymers with higher degrees of crosslinking were more salt sensitive.

TABLE 5

Co-Polymerized AA and $VSO_3NBu_4$ in 0.9% NaCl with varying degrees of crosslinking.

| AA (g) | $VSO_3NBu_4$ (g) | Cross-linker MBAA (g) | CRC (g/g) (2 hrs) | CRC Increase (%) |
|---|---|---|---|---|
| 10 | 0.00 | 0.045 | 41.4 | Control |
| 10 | 0.25 | 0.045 | 51.1 | 23.4 |
| 10 | 0.50 | 0.045 | 51.4 | 24.2 |
| 10 | 0.00 | 0.020 | 42.7 | Control |
| 10 | 0.25 | 0.020 | 57.6 | 34.9 |
| 10 | 0.50 | 0.020 | 57.9 | 35.6 |

It is readily discernible from the data of Tables 1-5 that a small percentage of strong-ionizable and super-ionizable salts can significantly increase the absorbing capacity in comparison to the controls made without such salts. For example, about 2.5 to about 5 wt % loading of tetra butyl ammonium salt can lead to a 20-35% increase in CRC and a 7-9% increase in AUL.

The data further indicate that it might be counter-productive to load strong-ionizable and super-ionizable salts at weight ratios higher than 10-15%, corresponding to greater than 5% in molar ratios. Without being bound to any particular theory, there are several possible reasons for this observation.

First, as the alkyl groups in the bulky ions (e.g. butyl groups in tetrabutylammonium) increase in size, the solubility of excess such salts in the polymerization mixture will become a major issue. The cloudiness of the mixture can be clearly seen when the loading levels of strong or super strong ionizable monomer with tetrabutylammonium as the counter ion exceed 5% in weight.

Second, too many fully dissociated ion pairs may have an adverse effect for absorbency. Almost naked charge centers can induce strong negative charge-positive charge ($Na^+$)—negative charge interactions among different chains with sodium ions acting as a go-between, which will lead to the formation of so-called "multi-plets". Such "multi-plets" function as alternative crosslinkers and thus decrease the capacity and swelling, as it can be hard to break them in the gel during swelling.

Third, the increased negative charge density along the polymer chain will limit or suppress the full dissociation of sodium counter ions from the chain, as they are still the dominant component of the co-polymers in accordance with the present disclosure.

SAMs Copolymerized with Select Metal Salts.

The following examples are used to demonstrate the feasibility of using co-polymerized SAMs. Select metal salts (e.g. various inorganic salts including a metal ion with an oxidation state of at least 2) were copolymerized with acrylic acid sodium salt (e.g. the primary component of the current base monomer for commercial SAMs). Samples synthesized without these salts under identical polymerization conditions were used as controls.

Comparative Example 2. Preparation of PAA-Based SAM Particles without a Coordination Complex Including a Metal Ion with an Oxidation State of at Least 2

15 grams of acrylic acid (AA) monomer is added to a glass reaction flask (e.g. a 120 mL wide mouth round jar, a beaker, or a round bottom flask) with a magnetic stir bar. The glass reaction flask should be equipped with a seal cap or a glass or rubber stopper. About 45 mLs of deionized (DI) water is added to the glass reaction flask with AA monomer and then cooled down to about 0° C. with an ice water bath. After cooling, 5.84 g of NaOH pellets at greater than 97% purity is added to the cold solution. Then the mixture is stirred with a magnetic stirrer until the NaOH pellets were fully dissolved. The dissolution normally takes about 10-20 minutes under stirring. Alternatively, the neutralization can be done by dropwise addition of a pre-prepared NaOH aqueous solution to an AA/water mixture with the final total water volume being the same.

The mixture is rigorously degassed with either high purity nitrogen or argon to remove trapped air in the reaction mixture and also replace the air in the glass reaction flask. At least 5-10 minute degassing times are recommended. After about 5 minutes into the degassing step, an initiator (about 45 mg of 99.99% Potassium Persulfate (KPS)) and a cross-linker (about 68 mg of greater than 99% MBAA (N,N-MethyleneBis(Acrylamide)), both pre-dissolved in 4 mL of deionized water at room temperature, were added to the cold neutralized AA solution in DI-water. Then the degassing process was continued.

The glass reaction flask is then sealed and transferred to a pre-heated water bath equipped with a magnetic stirrer to start the single step thermal radical polymerization process. The polymerization temperature is controlled in the range of about 60 to about 70° C., and is more specifically about 65° C. The flask is either placed directly into a pre-heated bath or placed into a temperature bath that starts at room temperature and is gradually increased to about 65° C. or any desired final polymerization temperature The gelling time is monitored (e.g. by determining when the magnetic stir bar stops stirring). The gelling for control samples (e.g. solutions become viscous and then the stir bars stop stirring) can be observed only when the temperature reaches above 50-65° C. for at least 5-20 mins. After gelling, the gel remains in the heating bath for an additional 4 hours to ensure the completion of the polymerization.

After polymerization, the gel is removed from the glass reaction flask. A knife or a scissor is used to cut the big gel block into small chunks for easy drying. A blender can be used for breaking up the big gel block to small pieces. After cutting, the resulted gel chunks are dried in an 85° C. oven for at least 24-48 hours. The drying can also be done by accelerated drying procedures, with air dryers, with desired oven temperatures, with hot air flows, and combinations thereof. The drying process can also be performed through a dynamic belt system with a combination of heat, vacuum, and through air drying techniques.

Dried gel chunks are then placed into a coffee blender or any suitable tool for breaking down to desired particle sizes. US Standard sieves are used to collect particles with desired size ranges (e.g. 300-600 microns).

Example 5. Preparation of PAA-Based SAM Particles with Strong or Super Strong Ionizable Monomers The reaction procedure of Comparative Example 2 is followed, with the exception that after the degassing step, a desired amount of selected metal salts is added to the mixtures and then degassing is continued for another 5-10 minutes.

Example 6. AUL and CRC Results of Synthesized Polymers

The swelling results, namely absorption under load (AUL) and centrifuge retention capacity (CRC), for the prepared polymers of Comparative Example 2 and Example 5 are presented in Table 6. For comparison, the CRC of Evonik 5630 is about 32.1 g/g. AUL was measured according to the procedures of Example 2 and CRC was measured according to the procedures of Example 3.

TABLE 6

Co-Polymerized AA and $FeCl_3$ in 0.9% NaCl.

| AA (g) | KPS (g) | MBAA (g) | $FeCl_3$ (mg) | CRC (g/g) | CRC Increase (%) | AUL (0.9 PSI) (2 hr) | AUL (0.9 PSI) (>72 hrs) |
|---|---|---|---|---|---|---|---|
| 15 | 0.045 | 0.068 | 0 | 37.7 | Control | 9.4 | 26.4 |
| 15 | 0.045 | 0.068 | 0.10 | 37.5 | ~0.0 | 9.7 | 26.2 |
| 15 | 0.045 | 0.068 | 1.0 | 45.4 | 20.8 | 9.8 | 27.0 |
| 15 | 0.045 | 0.068 | 10 | 52.1 | 38.5 | 9.3 | 27.1 |
| 15 | 0.045 | 0.068 | 20 | 47.4 | 25.8 | 9.0 | 25.5 |
| 15 | 0.045 | 0.068 | 40 | 42.9 | 13.8 | 8.7 | 24.3 |
| 15 | 0.045 | 0.068 | 100 | 28.9 | −23.4 | 8.5 | 22.0 |

TABLE 7

Co-Polymerized AA and $CaCl_2$ in 0.9% NaCl.

| AA (g) | KPS (g) | MBAA (g) | $CaCl_2$ (mg) | CRC (g/g) | AUL (0.9 PSI) (2 hr) | AUL (0.9 PSI) (>72 hrs) |
|---|---|---|---|---|---|---|
| 15 | 0.045 | 0.068 | 0 | 37.7 | 9.4 | 26.4 |
| 15 | 0.045 | 0.068 | 1.0 | 37.6 | 9.9 | 25.7 |
| 15 | 0.045 | 0.068 | 10 | 38.1 | 9.5 | 25.8 |
| 15 | 0.045 | 0.068 | 20 | 37.1 | 10.3 | 25.6 |
| 15 | 0.045 | 0.068 | 30 | 38.3 | 9.6 | 25.3 |

TABLE 8

Co-Polymerized AA and $Al_2(SO_4)_3$ in 0.9% NaCl.

| AA (g) | KPS (g) | MBAA (g) | $Al_2(SO_4)_3$ (mg) | CRC (g/g) | AUL (0.9 PSI) (2 hr) | AUL (0.9 PSI) (>72 hrs) |
|---|---|---|---|---|---|---|
| 15 | 0.045 | 0.068 | 0 | 37.7 | 9.4 | 26.4 |
| 15 | 0.045 | 0.068 | 1.0 | 38.2 | 9.6 | 25.3 |
| 15 | 0.045 | 0.068 | 10 | 37.9 | 9.7 | 25.5 |
| 15 | 0.045 | 0.068 | 20 | 38.7 | 10.0 | 25.8 |
| 15 | 0.045 | 0.068 | 30 | 38.9 | 10.0 | 26.7 |

TABLE 9

Co-Polymerized AA and $CoCl_2$ in 0.9% NaCl.

| AA (g) | KPS (g) | MBAA (g) | $CoCl_2$ (mg) | CRC (g/g) |
|---|---|---|---|---|
| 15 | 0.045 | 0.068 | 0 | 37.7 |
| 15 | 0.045 | 0.068 | 1.0 | 38.0 |
| 15 | 0.045 | 0.068 | 10 | 38.0 |
| 15 | 0.045 | 0.068 | 15 | 36.7 |
| 15 | 0.045 | 0.068 | 20 | 36.6 |

TABLE 10

Co-Polymerized AA and $MnCl_2$ in 0.9% NaCl.

| AA (g) | KPS (g) | MBAA (g) | $MnCl_2$ (mg) | CRC (g/g) |
|---|---|---|---|---|
| 15 | 0.045 | 0.068 | 0 | 37.7 |
| 15 | 0.045 | 0.068 | 1.0 | N/A |
| 15 | 0.045 | 0.068 | 10 | N/A |
| 15 | 0.045 | 0.068 | 20 | N/A |
| 15 | 0.045 | 0.068 | 40 | N/A |

Tables 6-10 present the data for polymers copolymerized with select metal salts. In the case of $FeCl_3$, significant CRC increases can be seen with only a very small amount of $FeCl_3$ loading (about 10 mg $FeCl_3$ to 15 g AA), in comparison to the control. In contrast, too much $FeCl_3$ loading produces chelation that dominates at high loading levels.

Data presented in Tables 6-10 are significant in multiple facets. First, they clearly show (and thereby contradict traditional thinking) that select inorganic salts, if used properly and also in appropriate amounts, actually increase the SAM capacities instead of decreasing them. Second, oxidation states higher than 2 are not the sole determining factor for a given metal ion in terms of its real potential for SAM capacity enhancement. Under the synthesis conditions and with select salts examined in the present disclosure, it has been found that $FeCl_3$, performed best while $CaCl_2$, and $Al_2(SO_4)_3$ performed only slightly, and $CaCl_2$ and $CoCl_2$ have no impact. No polymerization was actually observed at all for $MnCl_2$.

As described earlier, higher oxidation states of the metal center generate more free ions along the SAM polymer chains and networks (FIG. 2C), so it is expected that $CaCl_2$ and $CoCl_2$ will not generate enough free ions like $FeCl_3$, through complexation with monomers. Additionally, it is well known that $Ca^{2+}$ and $Co^{2+}$ are more prone to forming chelate structures in water than $Fe^{3+}$, so the capacity increase from coordination might be compensated by their chelation impacts. For $Al_2(SO_4)_3$, the intrinsic nature of $Al^{3+}$ also prefer the formation of dimers or long chains in aqueous solutions (e.g. more crosslinking), so its capacity enhancement is expected to be lower than $Fe^{3+}$ even though both ions have the same oxidation state of 3. For $MnCl_2$, although copolymerization was not observed, a color change was observed during polymerization. This color change suggests that $Mn^{2+}$ might be directly converted to $Mn^{4+}$ by reaction with KPS so that the polymerization process is quenched.

It should be noted here that those skilled in the arts might be able to fine-tune the polymerization conditions for each selected salt to maximize its SAM capacity and increase potential. It should be understood that some-select salts' may work under some sets of polymerization conditions but may not work in some other polymerization conditions, and vice versa. For example, one of the tuning methods is to use the coordinated organic ligands (e.g. L) to replace one or more water molecules at the metal center (i.e. form $ML_x^{2+}$ or $ML_x^{3+}$) so that the metal center's coordination capability and also geometry to monomers can be controlled and manipulated. In addition, the coordination of organic ligands to metal centers can significantly alter the oxidation potentials of the said metal center so that the polymerization conditions can be changed to accommodate more redox sensitive metal centers. The use of organic ligands may be particularly useful for stabilizing some very unstable metal salts such as $Co^{3+}$ and $Mn^{3+}$ so that they can be used as stable salts like $Fe^{3+}$. The suitable organic ligands (e.g. L) may include, but are not limited to, monodentated, bidentated, and multipledentated ligands such as those commonly used in inorganic/organic/organometallic chemistries. Specific examples include $OR_2$, $NR_1$, $PR_1$, $OR_2(CH_2)_nOR_2$, $NR_2(CH_2)_nNR_2$, $PR_2(CH_2)_nPR_2$, etc. where R is an alkyl group selected from the group consisting of methyl, ethyl, butyl, and combinations thereof.

The results demonstrated in Tables 6-10 surprisingly demonstrate that traditional multivalent inorganic salts can be used for SAM salt sensitivity mitigation. Notably, this discovery is in direct opposition to the current understanding that high valent inorganic salts suppress SAM capacity more than monovalent salts such as sodium chloride.

This surprising discovery provides significant benefits. The methods according to the present disclosure could potentially be a very cost effective method to increase SAM capacity. Transition multivalent inorganic sats, such as $FeCl_3$, are inexpensive, and the loading levels of the present disclosure are small.

This written description uses examples to illustrate the present disclosure, including the best mode, and also to enable any person skilled in the art to practice the disclosure, including making and using any compositions or systems and performing any incorporated methods. The patentable scope of the disclosure is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

As used herein, the terms "comprises," "comprising," "includes." "including," "has," "having," "contains", "containing," "characterized by" or any other variation thereof, are intended to cover a non-exclusive inclusion, subject to any limitation explicitly indicated. For example, a composition, mixture, process or method that comprises a list of elements is not necessarily limited to only those elements but may include other elements not expressly listed or inherent to such composition, mixture, process or method.

The transitional phrase "consisting of" excludes any element, step, or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

The transitional phrase "consisting essentially of" is used to define a composition or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Where an invention or a portion thereof is defined with an open-ended term such as "comprising," it should be readily understood that (unless otherwise stated) the description should be interpreted to also describe such an invention using the terms "consisting essentially of" or "consisting of."

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the invention are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

As used herein, the term "about" means plus or minus 10% of the value.

What is claimed is:

1. A superabsorbent polymer comprising:
a polymer backbone comprising:
a strong or super strong ionizable backbone monomer comprising:
an anion of a strong organic acid; and
a super ionizable counter ion;
a neutralized backbone monomer; and
an un-neutralized backbone monomer; and
optionally a crosslinker;
wherein the polymer backbone lacks structured ordering of the strong or super strong ionizable backbone monomer, the neutralized backbone monomer, and the un-neutralized backbone monomer.

2. The superabsorbent polymer of claim 1, wherein the strong or super strong ionizable backbone monomer is present in an amount in the range of from about 0.01 to about 5 mol % of the superabsorbent polymer, the neutralized backbone monomer is present in an amount in the range of from about 50 to about 99 mol % of the superabsorbent polymer, and the un-neutralized backbone monomer is present in an amount in the range of from about 0 to about 40 mol % of the superabsorbent polymer.

3. The superabsorbent polymer of claim 1, wherein the strong or super strong ionizable backbone monomer is present in an amount less than about 15 wt % of the combined amounts of the neutralized backbone monomer and the un-neutralized backbone monomer.

4. The superabsorbent polymer of claim 1, wherein the superabsorbent polymer is in a form selected from the group consisting of a particle, a gel, a fiber, a bead, a liquid, a solid, a paste, or combinations thereof.

5. The superabsorbent polymer of claim 1, wherein the superabsorbent polymer is in the form of a particle with a diameter in the range of about 100 μm to about 1000 μm.

6. The superabsorbent polymer of claim 1, wherein the superabsorbent polymer does not comprise a crosslinker.

7. The superabsorbent polymer of claim 1, wherein the neutralized backbone monomer and the un-neutralized backbone monomer are each individually selected from the group consisting of acrylic acids, methacrylic acids, vinyl sulfonic acids, vinyl phosphoric acids, partially hydrolyzed maleic anhydrides, and combinations thereof.

8. The superabsorbent polymer of claim 1, wherein the super ionizable counter ion is selected from the group consisting of ammonium, tetramethylammonium, tetraethylammonium, tetrabutylammonium, and combinations thereof.

9. The superabsorbent polymer of claim 1, wherein the super ionizable counter ion has a major dimension greater than about 0.25 nm.

10. The superabsorbent polymer of claim 1, wherein the anion of a strong organic acid is selected from the group consisting of sulfonic acids, sulfuric acids, phosphonic acids, nitric acids, and combinations thereof.

* * * * *